US012719285B1

(12) United States Patent
Harvey et al.

(10) Patent No.: US 12,719,285 B1
(45) Date of Patent: Aug. 25, 2026

(54) OPTIMIZATION OF INVERTER AND CAPACITOR BANK SIZING FOR REACTIVE POWER MANAGEMENT

(71) Applicant: BrightNight Power LLC, West Palm Beach, FL (US)

(72) Inventors: Lucas Harvey, Orinda, CA (US); Cédric Leroy, Austin, TX (US); Benjamin Calvin Bourne, Davis, CA (US)

(73) Assignee: BrightNight Power LLC, West Palm Beach, FL (US)

( * ) Notice: Subject to any disclaimer, the term of this patent is extended or adjusted under 35 U.S.C. 154(b) by 0 days.

(21) Appl. No.: 19/577,269

(22) Filed: Mar. 24, 2026

(51) Int. Cl.
*H02J 3/38* (2026.01)
*G05B 13/04* (2006.01)
*H02J 3/1821* (2026.01)
*H02J 3/32* (2006.01)
*H02J 101/24* (2026.01)
*H02J 103/30* (2026.01)

(52) U.S. Cl.
CPC ................ *H02J 3/38* (2013.01); *G05B 13/04* (2013.01); *H02J 3/1871* (2013.01); *H02J 3/32* (2013.01); *H02J 2101/24* (2026.01); *H02J 2103/30* (2026.01)

(58) Field of Classification Search
CPC ............ H02J 3/1871; H02J 3/32; G05B 13/04
See application file for complete search history.

(56) References Cited

U.S. PATENT DOCUMENTS 9,819,182 B1 * 11/2017 Batten ........................ H02J 1/08
9,882,507 B2 * 1/2018 Garrity ...................... H02J 3/18
11,728,651 B1 * 8/2023 Sheehy ...................... H02J 3/32 307/43
12,266,932 B1 * 4/2025 Leroy ...................... H02J 3/004
12,401,202 B1 * 8/2025 Ellis ......................... H02J 3/004
2012/0098346 A1 * 4/2012 Garrity .................... H02J 3/381 307/82
2015/0331972 A1 * 11/2015 McClure ................. G06F 17/11 703/2
2015/0364919 A1 * 12/2015 Schumer .................. H02J 3/28 700/291
2023/0289697 A1 * 9/2023 Fan .................. G06Q 10/06393

* cited by examiner

*Primary Examiner* — Mohammad Ali
*Assistant Examiner* — Vincent W Chang
(74) *Attorney, Agent, or Firm* — Foley & Lardner LLP

(57) ABSTRACT

A non-transitory computer-readable medium stores instructions that, when executed by processors, cause them to configure an electrical generation facility to meet a power factor requirement by determining a range of inverter counts, generating combinations of inverter counts and power factor settings based on manufacturer specifications, filtering combinations where active power output exceeds a peak output limit, calculating total reactive power contribution for each combination, determining plant-level power factor based on losses across facility components, determining capacitor bank size to address remaining reactive power gaps, generating a configuration matrix comprising inverter count, power factor setting, and capacitor bank size, applying an optimization algorithm to determine deployment factors, and selecting a configuration based on those factors.

20 Claims, 5 Drawing Sheets

OPTIMIZATION OF INVERTER AND CAPACITOR BANK SIZING FOR REACTIVE POWER MANAGEMENT

BACKGROUND

In utility-scale AC power generation, particularly from renewable sources such as solar and wind, compliance with interconnection power factor (PF) requirements is critical for grid stability and operational approval. Existing approaches often rely on predetermined equipment sizing or rule-of-thumb adjustments to inverters and reactive compensation devices. Such methods typically optimize for engineering feasibility alone, neglecting the interplay between reactive power compliance, real power delivery, and financial return.

Conventional inverter sizing practices may not fully leverage the revenue potential of increased DC-to-AC ratios, while overuse of capacitor banks can lead to unnecessary capital expenditure without added energy production. Reactive compensation is frequently treated as a discrete retrofit decision instead of being integrated into the initial configuration in a cost-performance-optimized way.

There is a need for a systematic approach that concurrently considers inverter quantity, inverter power factor control, and supplemental capacitor bank deployment to achieve PF compliance in a manner that also maximizes net revenue and minimizes capital and operational costs enabling developers to deploy generation facilities that are both technically compliant and financially optimal.

BRIEF DESCRIPTION OF FIGURES

Non-limiting and non-exhaustive examples are described with reference to the following figures.

DETAILED DESCRIPTION

Figure 1:
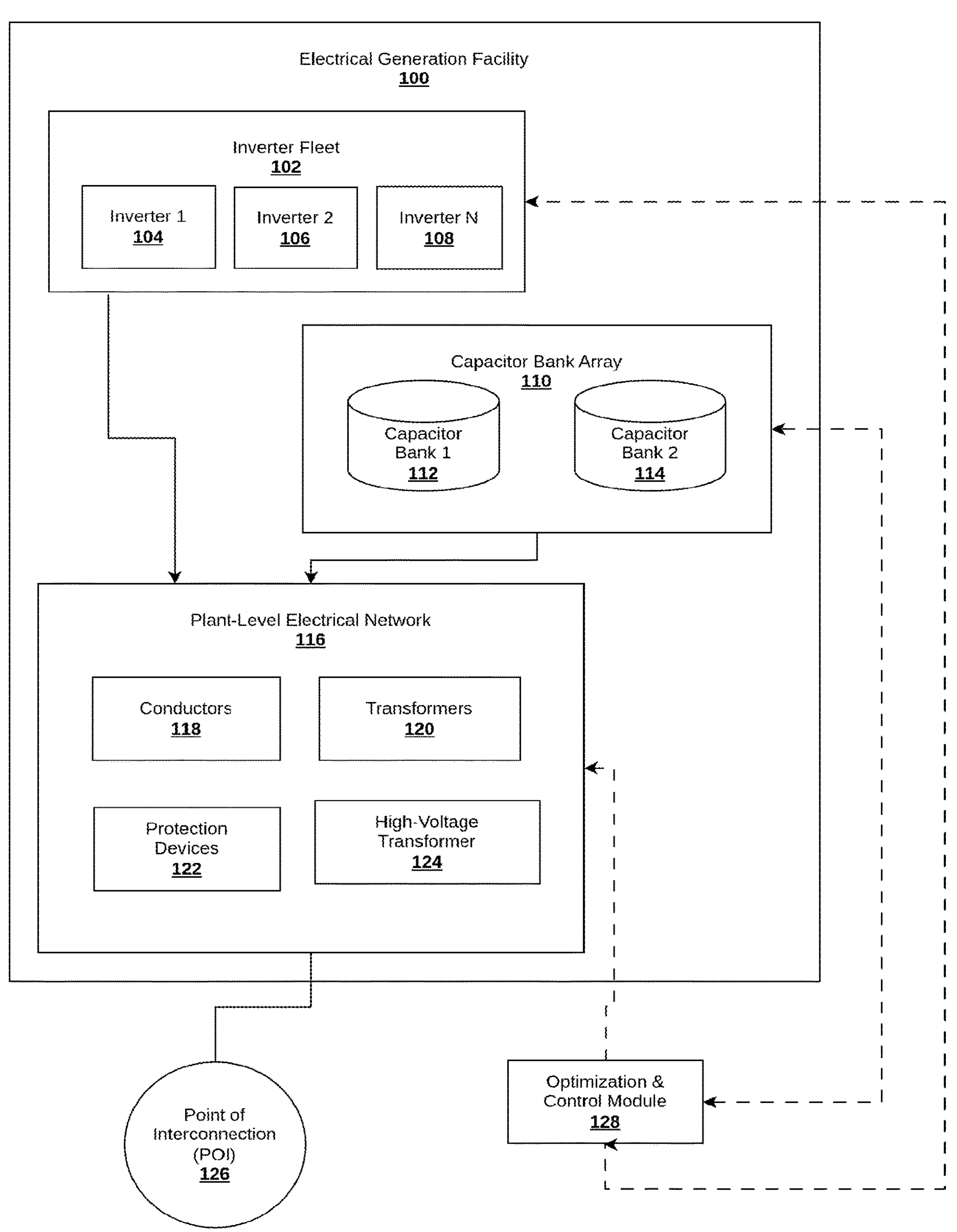
FIG. 1 illustrates a block diagram of an electrical generation facility with an inverter fleet and capacitor bank array, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

This disclosure relates to techniques for optimizing the selection and sizing of inverters and capacitor banks in electrical generation facilities to meet power factor requirements at a point of interconnection while achieving favorable financial performance. Electrical generation facilities, such as solar power plants or wind generation facilities, convert power from generation sources into alternating current (AC) power for delivery to external electrical grids. In AC systems, electrical equipment such as inverters and transformers generate reactive power due to misalignment between current and voltage waveforms. The combination of real power and reactive power determines the apparent power and power factor characteristics of a facility. To maintain grid stability and efficiency, utilities and interconnection authorities impose power factor requirements on generation facilities at the point of interconnection. The power factor, defined as the ratio of real power to apparent power, can be adjusted through inverter power factor control or through deployment of reactive power compensation equipment such as capacitor banks.

However, conventional approaches to meeting power factor requirements often rely on predetermined equipment sizing or rule-of-thumb adjustments that do not account for the interplay between reactive power compliance, real power delivery, and financial return. Conventional inverter sizing practices may not fully leverage the revenue potential of increased direct current (DC) to AC ratios, while overuse of capacitor banks can lead to unnecessary capital expenditure without added energy production. Reactive compensation is frequently treated as a discrete retrofit decision instead of being integrated into the initial configuration in a cost-performance-optimized manner. Conventional approaches may prioritize engineering feasibility alone, resulting in configurations that meet technical requirements but do not maximize net revenue or minimize capital and operational costs.

The techniques described herein provide a systematic approach that concurrently considers inverter quantity, inverter power factor control, and supplemental capacitor bank deployment to achieve power factor compliance in a manner that maximizes net revenue and minimizes capital and operational costs. The techniques described herein can evaluate multiple configuration options for an inverter fleet and a capacitor bank array to determine arrangements that meet power factor requirements at the point of interconnection while achieving desired financial performance characteristics. The techniques described herein can prioritize meeting real power needs with inverters before using capacitor banks to satisfy remaining reactive power requirements, minimizing additional capital expenditures associated with reactive power compensation equipment.

To implement the techniques described herein, an optimization process can iterate through a range of inverter counts from a minimum quantity to a maximum design capacity for an electrical generation facility. For each inverter quantity, the optimization process can iterate through a range of acceptable inverter power factor settings based on manufacturer specifications. The optimization process can filter combinations where a product of the inverter count and an active power output at the corresponding inverter power factor setting exceeds a peak output limit at the point of interconnection. For each remaining combination of inverter count and power factor setting, the optimization process can calculate a total reactive power contribution from the inverters and determine a plant-level power factor by modeling real and reactive losses across facility components, such as conductor wire losses, inverter inefficiencies, medium-voltage transformer losses, or high-voltage transformer losses, among others. The optimization process can determine a capacitor bank size to address a remaining gap in reactive power needed to meet the power factor requirement at the point of interconnection. The optimization process can generate a configuration matrix mapping the number of inverters, the power factor of the inverters, and the required size of supplemental capacitor banks. The optimization process can apply an optimization algorithm to the configuration matrix to determine deployment factors, such as initialization cost, expected energy production, or financial return, among others, for each configuration. The optimization process can select a configuration from the configuration matrix based on the deployment factors.

In doing so, the techniques described herein can generate equipment configurations that result in improved financial performance of electrical generation facilities while maintaining compliance with power factor requirements at the point of interconnection. By combining inverter power factor control with capacitor bank sizing in a unified optimization framework, the techniques described herein provide a more consistent and accurate approach to equipment selection that improves the alignment between technical compliance and financial performance objectives. The techniques described herein can be particularly useful in scenarios where the trade-off between allocating inverter capacity for reactive power compensation versus maximizing real power delivery affects revenue generation, such as when solar clipping occurs at high DC-to-AC ratios. The equipment configurations generated using the techniques described herein improve facility financial performance without requiring predetermined equipment sizing rules or engineering margins that may result in over-provisioning of reactive power compensation equipment, providing a technical improvement over existing approaches.

Referring to FIG. 1, an electrical generation facility 100 is configured to generate electrical power for transmission to an external power grid through a point of interconnection. The electrical generation facility 100 comprises various power generation sources and electrical components arranged to convert generated power into a form suitable for grid interconnection while meeting power factor requirements imposed by utility interconnection standards. In some cases, the electrical generation facility 100 is configured as a photovoltaic power plant with solar panels generating direct current (DC) power that is converted to alternating current (AC) power through power conversion equipment. In other cases, the electrical generation facility 100 is configured as a wind generation facility with wind turbines generating power that is processed through power conditioning equipment to meet grid interconnection standards.

The electrical generation facility 100 includes an inverter fleet 102 comprising multiple power conversion devices arranged to convert DC power to AC power or to condition AC power for grid interconnection. The inverter fleet 102 is configured to provide both real power and reactive power within manufacturer-specified power factor limits, allowing for adjustment of power factor characteristics at the facility level. In photovoltaic applications, the inverter fleet 102 receives DC power from solar panel arrays and converts the DC power to three-phase AC power suitable for transmission through the facility's electrical network. In wind generation applications, the inverter fleet 102 receives AC power from wind turbine generators and conditions the AC power to meet grid interconnection requirements, including voltage regulation and power factor control.

As further shown in FIG. 1, the electrical generation facility 100 also includes a capacitor bank array 110 configured to provide reactive power compensation to the facility's electrical network. The capacitor bank array 110 comprises multiple capacitive elements that are selectively connected to or disconnected from the electrical network to adjust the overall reactive power characteristics of the facility. In some cases, the capacitor bank array 110 is used in conjunction with the inverter fleet 102 to achieve target power factor values at the point of interconnection while allowing the inverter fleet 102 to operate at power factor settings that maximize real power delivery. The combination of the inverter fleet 102 and capacitor bank array 110 provides flexibility in meeting power factor requirements while maintaining efficient power generation and transmission characteristics.

The physical arrangement of the inverter fleet 102 and capacitor bank array 110 within the electrical generation facility 100 is configured to optimize power flow and minimize electrical losses throughout the facility's electrical network. The inverter fleet 102 and capacitor bank array 110 are interconnected through electrical conductors, transformers, and protection devices that facilitate power transmission from the generation sources to the point of interconnection. In some cases, the components work together to manage both real and reactive power flows, with the inverter fleet 102 providing primary power conversion functions and the capacitor bank array 110 providing supplemental reactive power compensation as needed to meet grid interconnection requirements.

The inverter fleet 102 comprises individual power conversion units arranged to process electrical power from generation sources and deliver conditioned power to the electrical generation facility 100. An inverter 104 is configured as a power conversion device that receives input power and converts the input power to alternating current output power with controllable power factor characteristics. The inverter 104 includes power semiconductor switching devices, control circuitry, and filtering components arranged to perform power conversion functions while maintaining power quality standards. In photovoltaic applications, the inverter 104 receives direct current power from solar panel arrays and converts the direct current power to three-phase alternating current power through pulse-width modulation switching techniques. The inverter 104 is rated for specific power handling capabilities, such as continuous power output ratings measured in kilowatts or megawatts, and operates within manufacturer-specified power factor limits that define the range of real and reactive power combinations that the inverter 104 provides.

An inverter 106 is configured with similar power conversion capabilities as the inverter 104, providing additional power processing capacity within the inverter fleet 102. The inverter 106 includes independent control systems that allow the inverter 106 to operate at power factor settings that differ from those of the inverter 104, providing flexibility in managing reactive power distribution across the inverter fleet 102. In some cases, the inverter 106 is configured as a string inverter connected to distributed photovoltaic arrays, where the inverter 106 processes power from a specific subset of solar panels within the generation facility. In other cases, the inverter 106 is configured as a central inverter coupled to a common medium-voltage bus, where the inverter 106 handles power from multiple generation sources through a centralized power collection system. The inverter 106 incorporates maximum power point tracking algorithms that optimize power extraction from connected generation sources while maintaining controllable power factor output characteristics.

An nth inverter 108 represents additional power conversion units within the inverter fleet 102, where the total quantity of inverters is determined based on the power generation capacity and grid interconnection requirements of the electrical generation facility 100. The nth inverter 108 is configured with power conversion specifications that match or complement those of the inverter 104 and inverter 106, providing scalable power processing capability for the facility. The range of feasible quantities of inverters installed in the facility is determined by factors including available generation capacity, interconnection limits, and economic considerations related to capital expenditure and operational efficiency. Each inverter within the inverter fleet 102, including the nth inverter 108, operates within manufacturer-specified power factor limits that define the allowable range of power factor settings for each individual unit. These power factor limits typically range from leading power factors of approximately 0.85 to lagging power factors of approximately 0.85, though specific limits vary based on inverter design and manufacturer specifications.

The individual inverters within the inverter fleet 102 are configured to provide both real power and reactive power output, where the combination of real and reactive power determines the apparent power and power factor characteristics of each unit. The DC-to-AC ratio calculation affects solar clipping at both the individual inverters and the point of interconnection, which impacts real power delivery and revenue generation for the facility. When the available direct current power from generation sources exceeds the alternating current power rating of an inverter, clipping occurs where excess power generation is curtailed to prevent inverter overload. The inverters include control systems that monitor input power conditions and adjust power conversion parameters to maximize power throughput while maintaining safe operating conditions and grid compliance requirements. In some cases, the inverters incorporate reactive power control capabilities that allow each unit to absorb or supply reactive power independent of real power output, providing flexibility in meeting facility-level power factor requirements through coordinated operation of multiple inverter units.

The capacitor bank array 110 comprises multiple reactive power compensation devices arranged to provide controllable reactive power support to the electrical generation facility 100 without affecting real power generation characteristics. A first capacitor bank 112 is configured as a reactive power source that provides leading reactive power to the facility's electrical network through capacitive elements arranged in parallel or series configurations. The first capacitor bank 112 includes multiple capacitor units rated for specific reactive power output levels, such as kilovolt-ampere reactive (kVAR) ratings that define the reactive power contribution of the first capacitor bank 112 under nominal operating conditions. In some cases, the first capacitor bank 112 is physically located at a medium-voltage side of a transformer within the electrical network, where the first capacitor bank 112 provides reactive power compensation at voltage levels that correspond to the facility's power collection and transmission infrastructure. The first capacitor bank 112 includes protective devices such as fuses, surge arresters, and disconnect switches that provide isolation and protection functions during normal and fault conditions.

A capacitor bank 114 is configured with reactive power compensation capabilities that complement those of the first capacitor bank 112, providing additional reactive power capacity for meeting power factor requirements at the point of interconnection. The capacitor bank 114 includes capacitive elements with reactive power ratings that are the same as or different from those of the first capacitor bank 112, allowing for flexible reactive power management across varying load and generation conditions. In some cases, the capacitor bank 114 is configured as a switched capacitor bank controlled in discrete reactive power steps, where the capacitor bank 114 is connected to or disconnected from the electrical network through switchgear operations that provide step-wise adjustment of reactive power compensation. The discrete switching capabilities of the capacitor bank 114 allow for precise control of reactive power levels, where each switching operation adds or removes a predetermined amount of reactive power from the facility's electrical network. The capacitor bank 114 incorporates automatic switching controls that respond to power factor measurements or control signals from facility management systems.

The capacitor bank array 110 provides reactive power compensation functions that allow the electrical generation facility 100 to meet power factor requirements while allowing the inverter fleet 102 to operate at power factor settings that maximize real power output. The design process prioritizes meeting real power needs with the inverter fleet 102 before using the capacitor bank array 110 to satisfy remaining reactive power requirements while minimizing additional capital expenditures associated with reactive power compensation equipment. In some implementations, increasing the inverter quantity within the inverter fleet 102 to provide additional reactive power capacity incurs capital expenditure that may exceed the cost of providing equivalent reactive power capacity through the capacitor bank array 110. The cost per kilovolt-ampere reactive of inverter-based reactive power compensation can be higher than the cost per kilovolt-ampere reactive of capacitor bank-based compensation, where the inverter fleet 102 provides both real and reactive power capabilities while the capacitor bank array 110 provides reactive power compensation at a lower capital cost per unit of reactive power capacity. In some cases, the capacitor bank array 110 is sized to provide reactive power compensation that bridges the gap between the reactive power output capabilities of the inverter fleet 102 and the reactive power requirements imposed by grid interconnection standards. The combination of the inverter fleet 102 and capacitor bank array 110 allows the facility to achieve target power factor values through coordinated control of both real and reactive power sources, where the capacitor bank array 110 provides reactive power support without reducing the real power generation capacity of the facility.

Switchgear coupled to the capacitor bank array 110 provides control and protection functions for connecting and disconnecting individual capacitor banks from the facility's electrical network. The switchgear includes motor-operated switches or contactors associated with the first capacitor bank 112 and capacitor bank 114, where the motor-operated switches or contactors receive control signals that command connection or disconnection operations based on reactive power compensation requirements. In some cases, actuating switchgear comprises sending control signals to the motor-operated switches or contactors, where the control signals are generated by facility control systems that monitor power factor conditions and determine appropriate capacitor bank connection states. The switchgear includes protective relaying functions that monitor electrical conditions and provide automatic disconnection of capacitor banks during fault conditions or when electrical parameters exceed predetermined limits. The motor-operated switches or contactors are rated for the voltage and current levels associated with the capacitor banks, providing reliable switching operations under normal and emergency operating conditions.

The plant-level electrical network 116 comprises the electrical infrastructure that interconnects the inverter fleet 102 and capacitor bank array 110 with external grid connection points, facilitating power transmission while introducing various electrical losses that affect overall facility performance. The plant-level electrical network 116 includes multiple electrical components arranged in series and parallel configurations to collect power from distributed generation sources and deliver the power to a centralized interconnection point. In some cases, the plant-level electrical network 116 is configured with redundant power paths and protective systems that maintain power delivery capability during equipment maintenance or fault conditions. The electrical infrastructure is designed to handle both real and reactive power flows, where the network components introduce impedance that affect voltage regulation and power factor characteristics throughout the facility. The plant-level electrical network 116 operates at multiple voltage levels, including low-voltage collection circuits, medium-voltage distribution systems, and high-voltage transmission interfaces that correspond to different stages of power collection and delivery within the facility.

Conductors 118 comprise electrical cables, overhead lines, and bus bars that provide current-carrying paths between electrical components within the plant-level electrical network 116. The conductors 118 include copper or aluminum conductors with insulation systems rated for the operating voltages and environmental conditions of the electrical generation facility 100. In some cases, the conductors 118 are configured as underground cables with cross-linked polyethylene insulation and metallic shielding systems that provide protection against electrical and mechanical stresses. The conductors 118 introduce conductor resistance losses that vary with current magnitude, conductor temperature, and conductor material properties, where the resistance losses are calculated based on conductor length, cross-sectional area, and resistivity characteristics. Conductor wire losses represent a significant component of overall facility losses, particularly in large-scale generation facilities where power collection circuits extend over substantial distances. The conductors 118 are sized to carry rated current levels while maintaining voltage drop within acceptable limits, where larger conductor cross-sections reduce resistance losses but increase capital costs for the electrical infrastructure.

Transformers 120 comprise electromagnetic devices that provide voltage transformation functions within the plant-level electrical network 116, allowing power transfer between different voltage levels while maintaining electrical isolation between circuit segments. The transformers 120 include step-up transformers that increase voltage levels from generation sources to transmission levels, and step-down transformers that reduce voltage levels for auxiliary power systems or local loads. In some cases, the transformers 120 are configured as pad-mounted distribution transformers with oil or dry-type insulation systems that provide voltage transformation for medium-voltage collection circuits. The transformers 120 introduce transformer core losses and transformer load losses that contribute to overall facility electrical losses, where core losses remain relatively constant regardless of loading conditions, while load losses vary with the square of transformer current. Medium-voltage transformer losses occur in transformers that operate at voltage levels between approximately 4 kilovolts and 35 kilovolts, where the transformers collect power from multiple inverter units and deliver the power to higher voltage transmission circuits. The transformers 120 include tap-changing mechanisms that allow voltage ratio adjustments to maintain voltage regulation under varying load and generation conditions.

Protection devices 122 comprise electrical equipment that monitors system conditions and provides automatic isolation of faulted circuit segments to maintain system stability and equipment protection. The protection devices 122 include circuit breakers, reclosers, sectionalizers, and protective relays that detect abnormal electrical conditions such as overcurrent, overvoltage, undervoltage, and ground faults. In some cases, the protection devices 122 are configured with communication capabilities that allow coordinated protection schemes across multiple protection zones within the plant-level electrical network 116. The protection devices 122 introduce minimal electrical losses during normal operation, but provide isolation functions that prevent damage to electrical equipment during fault conditions. Circuit breakers within the protection devices 122 are rated for specific voltage and current interruption capabilities, where the circuit breakers operate within milliseconds to seconds depending on fault severity and protection coordination requirements. The protection devices 122 include current transformers and voltage transformers that provide scaled measurement signals for protective relaying functions, where the measurement transformers introduce small additional losses but provide information for system monitoring and control functions.

A high-voltage transformer 124 comprises a power transformer that provides voltage transformation between the medium-voltage collection system and high-voltage transmission levels for interconnection with external electrical grids. The high-voltage transformer 124 is configured as a three-phase transformer with voltage ratings that correspond to utility interconnection requirements, such as transformation from medium-voltage levels of 34.5 kilovolts to high-voltage levels of 138 kilovolts or higher. In some cases, the high-voltage transformer 124 includes load tap changing equipment that provides automatic voltage regulation under varying load and generation conditions. The high-voltage transformer 124 introduces high-voltage transformer losses that include both no-load losses and load losses, where no-load losses occur due to magnetizing current and core losses, while load losses result from winding resistance and leakage reactance effects. High-voltage transformer losses represent a substantial component of overall facility losses due to the high power levels processed by the high-voltage transformer 124. The high-voltage transformer 124 includes cooling systems such as forced-air cooling or oil circulation systems that maintain transformer temperatures within acceptable operating ranges during high-load conditions. Transformer impedance characteristics of the high-voltage transformer 124 affect voltage regulation and short-circuit current levels throughout the plant-level electrical network 116.

The electrical losses introduced by the conductors 118, transformers 120, and high-voltage transformer 124 are modeled to calculate expected real and reactive power at the point of interconnection for each inverter quantity and power factor setting evaluated during facility design optimization. Conductor resistance losses are calculated based on current squared times resistance values for each conductor segment, where resistance values vary with conductor temperature and current loading conditions. Transformer core losses and transformer load losses are determined from transformer test data and manufacturer specifications, where core losses remain relatively constant while load losses vary with transformer loading levels. The combination of conductor wire losses, inverter inefficiencies, medium-voltage transformer losses, and high-voltage transformer losses is used to determine plant-level power factor characteristics that account for the cumulative effects of all loss mechanisms within the facility. In some cases, electrical loss calculations include reactive power losses that affect the overall reactive power balance of the facility, where inductive losses in the conductors 118 and transformers 120 consume reactive power and affect power factor calculations at the point of interconnection.

A point of interconnection (POI) 126 comprises the electrical interface between the electrical generation facility 100 and an external power grid, where the point of interconnection (POI) 126 serves as the measurement and compliance verification point for power factor requirements imposed by utility interconnection standards. The point of interconnection (POI) 126 is configured as a metering and monitoring location where electrical parameters such as real power, reactive power, voltage, current, and power factor are continuously measured and recorded to verify compliance with grid interconnection agreements. In some cases, the point of interconnection (POI) 126 includes revenue-grade metering equipment that provides accurate measurement of electrical energy delivered to the external power grid, where the metering equipment is configured to measure both real energy and reactive energy flows in accordance with utility billing and settlement procedures. The point of interconnection (POI) 126 incorporates protective relaying systems that monitor electrical conditions and provide automatic disconnection of the electrical generation facility 100 from the external power grid during abnormal operating conditions such as voltage excursions, frequency deviations, or power quality disturbances. The electrical characteristics measured at the point of interconnection (POI) 126 serve as the reference point for determining compliance with interconnection requirements, where power factor measurements at the point of interconnection (POI) 126 are compared against contractual thresholds to verify that the facility meets grid interconnection standards.

The point of interconnection (POI) 126 provides real-time power factor measurements that are transmitted to facility control systems for dynamic adjustment of power generation and reactive power compensation equipment. In some cases, the point of interconnection (POI) 126 includes communication interfaces that allow bidirectional data exchange between utility control systems and facility management systems, where power factor measurements and other electrical parameters are shared in real-time to support coordinated grid operations. The measurement systems at the point of interconnection (POI) 126 include current transformers and voltage transformers that provide scaled measurement signals for protective relaying, metering, and monitoring functions, where the measurement transformers are rated for the voltage and current levels associated with the interconnection circuit. Power factor measurements obtained at the point of interconnection (POI) 126 are used to generate control signals that adjust the operating characteristics of the inverter fleet 102 and capacitor bank array 110 to maintain compliance with interconnection requirements under varying generation and load conditions. The point of interconnection (POI) 126 incorporates data logging capabilities that maintain historical records of power factor measurements and other electrical parameters for regulatory reporting and performance analysis purposes.

The point of interconnection (POI) 126 serves as the reference point for evaluating the effectiveness of reactive power management strategies implemented through coordinated operation of the inverter fleet 102 and capacitor bank array 110. Real and reactive power flows are adjusted in operation to meet power factor requirements while maintaining or improving delivery of real power to the point of interconnection (POI) 126, where the adjustments are based on continuous monitoring of electrical conditions at the interconnection interface. In some cases, the point of interconnection (POI) 126 includes power quality monitoring equipment that measures harmonic distortion, voltage flicker, and other power quality parameters that affect grid stability and customer equipment operation. The electrical measurements obtained at the point of interconnection (POI) 126 are used to verify that reactive power compensation provided by the capacitor bank array 110 and power factor control implemented through the inverter fleet 102 achieve the desired power factor characteristics without introducing adverse effects on power quality or system stability. The point of interconnection (POI) 126 incorporates automatic switching equipment that provides isolation capabilities during maintenance operations or emergency conditions, where the switching equipment is controlled remotely by utility operators or facility control systems.

Configuration selection for the electrical generation facility 100 is performed to maintain real power export at or below an interconnection limit established at the point of interconnection (POI) 126, where the interconnection limit is specified in utility interconnection agreements based on transmission system capacity and grid stability considerations. The point of interconnection (POI) 126 includes power flow monitoring systems that track real power delivery levels and provide alarm functions when power export approaches or exceeds contractual limits, where the monitoring systems generate control signals that reduce power generation or adjust power factor settings to maintain compliance with interconnection agreements. In some cases, the point of interconnection (POI) 126 is configured with multiple measurement points that allow monitoring of power flows in different phases or circuit segments, where the multiple measurement points provide detailed information about power distribution and load balancing within the interconnection interface. The high-voltage transformer 124 is connected to the point of interconnection (POI) 126 through high-voltage transmission circuits that carry power from the plant-level electrical network 116 to the external power grid, where the transmission circuits include additional protective devices and switching equipment that provide operational flexibility and system protection functions. The point of interconnection (POI) 126 incorporates voltage regulation equipment such as load tap changers or voltage regulators that maintain voltage levels within acceptable ranges under varying load and generation conditions, where voltage regulation affects reactive power flows and power factor characteristics measured at the interconnection interface.

An optimization & control module 128 comprises computational and control systems configured to manage the selection and operation of power generation and reactive power compensation equipment within the electrical generation facility 100. The optimization & control module 128 includes processing capabilities that evaluate multiple configuration options for the inverter fleet 102 and capacitor bank array 110 to determine arrangements that meet power factor requirements at the point of interconnection (POI) 126 while achieving desired financial performance characteristics. In some cases, the optimization & control module 128 is implemented as a programmable logic controller or an industrial computer integrated into a supervisory control and data acquisition system that provides centralized monitoring and control functions for the facility. The optimization & control module 128 incorporates data processing algorithms that analyze electrical system parameters, equipment specifications, and operational constraints to identify configurations that balance technical compliance with economic performance objectives. The computational capabilities of the optimization & control module 128 include mathematical modeling functions that simulate electrical losses, power flows, and power factor characteristics under various equipment operating scenarios.

The optimization & control module 128 can simulate the electrical generation facility 100 to evaluate candidate configurations prior to physical implementation. In some implementations, the optimization & control module 128 can execute time-series simulations that model power generation output, electrical losses through the conductors 118, transformers 120, or high-voltage transformer 124, reactive power flows, or power factor characteristics at the point of interconnection (POI) 126 over representative operating periods. The optimization & control module 128 can access stored equipment models, loss calculation algorithms, or historical weather data to project facility performance for each candidate configuration under evaluation. In some implementations, the optimization & control module 128 can model the coordinated operation of the first inverter 104, second inverter 106, nth inverter 108, first capacitor bank 112, or second capacitor bank 114 to determine reactive power compensation performance under varying generation conditions. Based on simulation results, the optimization & control module 128 can identify a configuration specifying an inverter quantity, an inverter power factor setting, or a capacitor bank size for physical implementation within the electrical generation facility 100.

The optimization & control module 128 includes a processor configured to execute computational algorithms that evaluate different combinations of inverter quantities, power factor settings, and capacitor bank sizes to identify configurations that satisfy power factor requirements. The processor accesses stored data regarding equipment specifications, electrical system parameters, and operational constraints to perform configuration analysis that consider both technical and financial aspects of equipment selection decisions. In some cases, the processor executes iterative calculation routines that systematically evaluate feasible equipment configurations, where each configuration is assessed for compliance with power factor requirements and projected financial performance characteristics. The processor incorporates mathematical modeling capabilities that simulate electrical losses in the conductors 118, transformers 120, and high-voltage transformer 124 to determine expected power characteristics at the point of interconnection (POI) 126 for each evaluated configuration. The computational functions performed by the processor include power flow calculations, loss modeling algorithms, and financial analysis routines that provide comprehensive evaluation of equipment configuration options.

The optimization & control module 128 includes a memory storing executable instructions that, when executed by the processor, cause the apparatus to perform configuration selection and control functions for the electrical generation facility 100. The memory stores software programs that implement optimization algorithms, control logic, and communication protocols for managing the operation of the inverter fleet 102 and capacitor bank array 110. In some cases, the executable instructions include database management functions that maintain records of equipment specifications, operational parameters, and historical performance data for use in configuration analysis and control decision-making processes. The memory stores mathematical models that represent the electrical characteristics of facility components, where the mathematical models are used to predict power flows, voltage levels, and power factor characteristics under different operating conditions. The executable instructions stored in the memory include real-time control algorithms that generate control signals for adjusting inverter power factor settings and capacitor bank connection states based on measured electrical conditions and predetermined control objectives.

The optimization & control module 128 generates a design matrix output that maps the relationship between number of inverters, power factor of those inverters, and required size of supplemental capacitor bank array 110 to meet power factor requirements at the point of interconnection (POI) 126. The design matrix comprises tabulated data that presents multiple configuration options, where each configuration option specifies a particular combination of inverter quantity, inverter power factor setting, and capacitor bank size that achieves compliance with interconnection requirements. Each column in the design matrix can be optimized to mitigate costs and revenue, finding a balance between the two based on preferences or goals. In some cases, the design matrix includes calculated values for expected real power output, reactive power compensation requirements, and electrical losses associated with each configuration option. The design matrix output provides facility designers and operators with comprehensive information for selecting equipment configurations that balance technical performance with economic considerations. The optimization & control module 128 updates the design matrix based on changes in equipment specifications, operational requirements, or interconnection standards, where the updated design matrix reflects current conditions and constraints affecting configuration selection decisions.

The optimization & control module 128 evaluates configurations based on net present value as a financial performance metric for selecting arrangements of the inverter fleet 102 and capacitor bank array 110 that achieve desired economic outcomes. The net present value calculations incorporate factors including capital expenditure requirements, operational costs, revenue projections, and equipment lifecycle considerations to determine the financial attractiveness of different configuration options. In some cases, the optimization & control module 128 evaluates financial performance metrics comprising payback period or internal rate of return in addition to net present value calculations, where multiple financial metrics provide comprehensive assessment of economic performance for each evaluated configuration. The financial analysis functions consider revenue impacts associated with real power delivery capabilities, where configurations that maximize real power output generate higher revenue streams compared to configurations that prioritize reactive power compensation. The optimization & control module 128 incorporates cost models that account for equipment procurement costs, installation expenses, and ongoing maintenance requirements to provide accurate financial performance assessments for configuration selection purposes.

The optimization & control module 128 is configured to determine, based on electrical loss modeling and power factor requirements at the point of interconnection (POI) 126, a target configuration including an inverter quantity, an inverter power factor setting, and a capacitor bank size that satisfies interconnection standards. The electrical loss modeling functions calculate expected losses in the plant-level electrical network 116, including conductor resistance losses, transformer core losses, and transformer load losses that affect power characteristics measured at the point of interconnection (POI) 126. In some cases, the target configuration determination process considers multiple candidate configurations that meet power factor requirements, where the selection of the target configuration is based on financial performance criteria or operational preferences specified by facility operators. The optimization & control module 128 incorporates constraint checking algorithms that verify each candidate configuration meets technical requirements including voltage regulation limits, equipment rating constraints, and grid interconnection standards. The target configuration selected by the optimization & control module 128 represents the arrangement of equipment that provides the most favorable combination of technical compliance and economic performance among the evaluated options.

The optimization & control module 128 is configured to send commands to the inverter fleet 102 to operate at the inverter power factor setting specified in the target configuration, where the commands include control signals that adjust the reactive power output characteristics of the first inverter 104, second inverter 106, and nth inverter 108. The control commands are transmitted through communication interfaces that provide data exchange capabilities between the optimization & control module 128 and individual inverter control systems within the inverter fleet 102. In some cases, the commands specify different power factor settings for different inverters within the inverter fleet 102, where the distributed power factor control provides flexibility in managing reactive power distribution across the facility. The optimization & control module 128 generates control instructions that configure the plurality of inverters to operate at the selected power factor through digital communication protocols that ensure reliable command transmission and execution. The control commands include verification functions that confirm successful implementation of power factor adjustments and provide feedback regarding inverter operating status to the optimization & control module 128.

The optimization & control module 128 is configured to operate switchgear to connect capacitor banks of the capacitor bank size specified in the target configuration to the electrical network of the electrical generation facility 100. The switchgear operation functions include generating control signals that actuate motor-operated switches or contactors associated with the capacitor bank 112 and second capacitor bank 114 to achieve the desired reactive power compensation characteristics. In some cases, the optimization & control module 128 coordinates the timing of switchgear operations with inverter power factor adjustments to provide smooth transitions between different reactive power compensation states. The switchgear control functions include protective interlocking features that prevent unsafe switching operations and ensure proper coordination between capacitor bank connection states and system operating conditions. The optimization & control module 128 monitors the status of switchgear operations and provides alarm functions when switching operations fail to complete successfully or when equipment malfunctions affect reactive power compensation capabilities.

The optimization & control module 128 includes a communication interface for transmitting the inverter control signals and switchgear control signals over an industrial control network protocol that provides reliable data exchange between control systems and field equipment. The communication interface supports multiple communication protocols including Ethernet-based protocols, serial communication standards, and wireless communication technologies that facilitate control signal transmission across the electrical generation facility 100. In some cases, the communication interface includes redundant communication paths that provide backup communication capabilities during primary communication system failures or maintenance operations. The industrial control network protocol incorporates data integrity checking functions that verify successful transmission of control signals and provide error detection capabilities for communication system monitoring. The communication interface supports bidirectional data exchange that allows the optimization & control module 128 to receive status information and measurement data from field equipment while transmitting control commands to adjust equipment operating parameters.

The optimization & control module 128 adjusts reactive power and real power delivery in real time to maintain compliance with the target power factor at the point of interconnection (POI) 126 through continuous monitoring and control functions. The real-time adjustment capabilities include feedback control algorithms that compare measured power factor values with target power factor requirements and generate corrective control actions when deviations exceed predetermined tolerance limits. In some cases, the optimization & control module 128 receives real-time power factor measurements from the point of interconnection (POI) 126 and dynamically adjusts inverter power factor settings and capacitor bank connection states to maintain compliance with interconnection requirements under varying operating conditions. The real-time control functions incorporate predictive algorithms that anticipate changes in generation output or load conditions and proactively adjust reactive power compensation to prevent power factor excursions. The optimization & control module 128 maintains historical records of power factor measurements and control actions to support performance analysis and regulatory reporting requirements for the electrical generation facility 100.

The optimization & control module 128 can simulate the electrical generation facility 100 under various equipment configurations to determine operational properties, control characteristics, and electrical output parameters associated with different arrangements of the inverter fleet 102 and capacitor bank array 110. The optimization & control module 128 can execute time-series simulations that model power generation output, electrical losses, reactive power flows, or power factor characteristics at the point of interconnection (POI) 126 over representative operating periods, such as hourly or sub-hourly intervals across a full year. In some implementations, the optimization & control module 128 can access stored equipment models, loss calculation algorithms, or historical weather data to perform simulations that project facility performance for each candidate configuration under evaluation. The simulations can model the coordinated operation of the first inverter 104, second inverter 106, nth inverter 108, first capacitor bank 112, or second capacitor bank 114 to determine reactive power compensation performance under varying generation conditions. The optimization & control module 128 can calculate, for each simulated time step, the direct current power available from generation sources, the alternating current power output after inverter conversion, the electrical losses (real and reactive) through the plant-level electrical network 116, or the power factor achieved at the point of interconnection (POI) 126.

The optimization & control module 128 can use simulations or calculations regarding different configurations of the electrical generation facility 100 to identify a configuration to be physically implemented within the facility. In some implementations, the optimization & control module 128 can aggregate simulation results to determine annual energy production, total clipping losses, or revenue projections that form the basis for deployment factors associated with each evaluated configuration. The optimization & control module 128 can compare simulated performance characteristics across multiple configurations to identify the arrangement of the inverter fleet 102 and capacitor bank array 110 that achieves the desired balance between power factor compliance and financial performance objectives. The optimization & control module 128 can evaluate scenarios where generation ramp-up or ramp-down causes the power factor at the point of interconnection (POI) 126 to deviate from target values, and the optimization & control module 128 can model control responses involving adjustments to inverter power factor settings or actuation of switchgear to connect additional capacitor banks. Based on the simulation results, the optimization & control module 128 can select a configuration specifying an inverter quantity, an inverter power factor setting, and a capacitor bank size for physical implementation. In some implementations, the optimization & control module 128 can transmit simulated and/or actual control signals to the simulated and/or actual inverter fleet 102 and capacitor bank array 110 to implement the selected configuration within the simulated and/or actual electrical generation facility 100.

Figure 2:
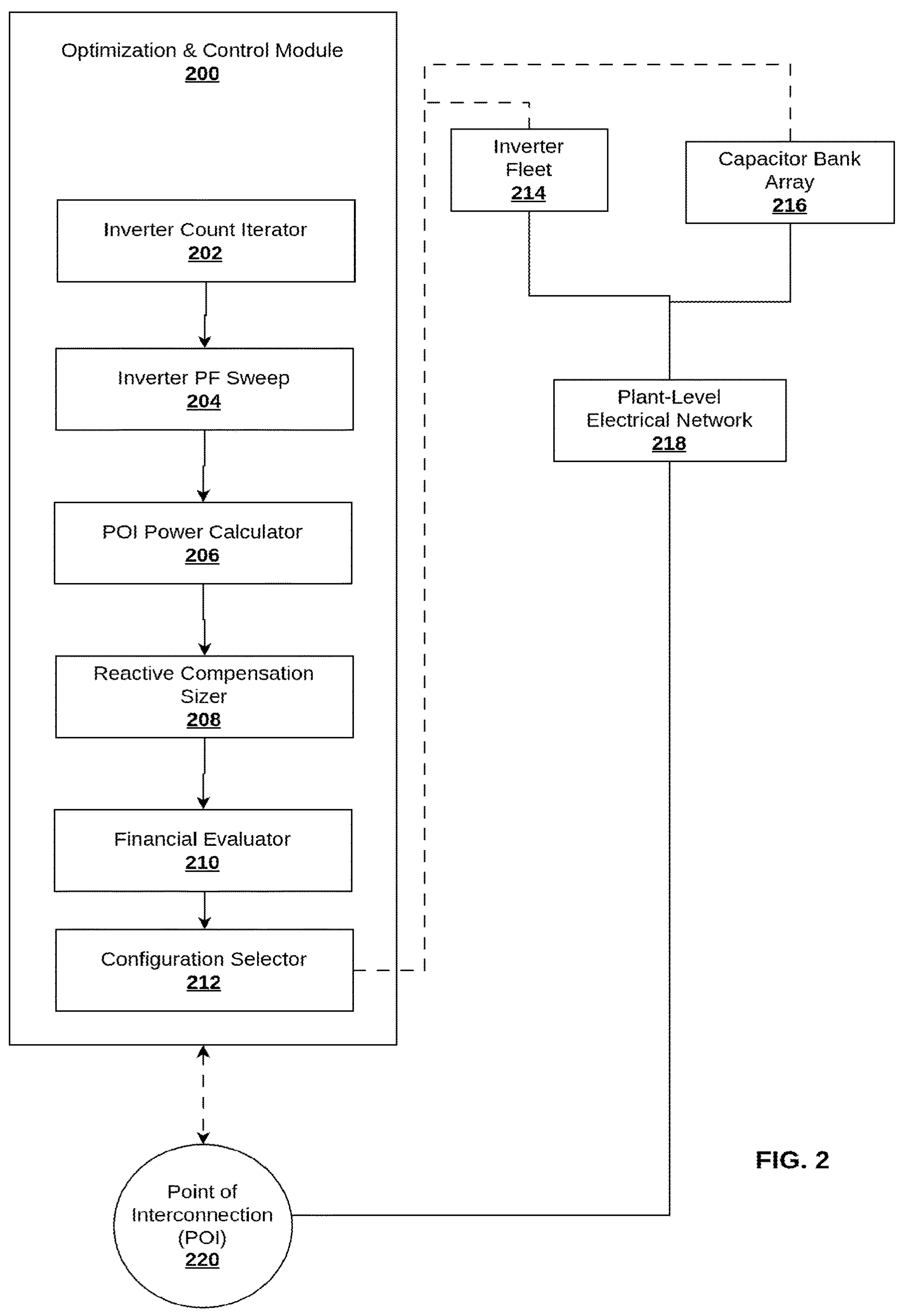
FIG. 2 illustrates a flowchart of an optimization and control process for managing power factor requirements in the electrical generation facility of FIG. 1, according to an embodiment.

Referring to FIG. 2, an optimization & control module 200 comprises a computational framework configured to systematically evaluate multiple equipment configurations for achieving power factor compliance at the point of interconnection (POI) 220. The optimization & control module 200 includes multiple processing components arranged to execute sequential analysis functions that consider technical constraints, equipment specifications, and financial performance criteria during configuration selection processes. In some cases, the optimization & control module 200 is configured to interface with facility equipment including an inverter fleet 214, a capacitor bank array 216, and a plant-level electrical network 218 to implement selected configurations through coordinated control actions. In some implementations, the inverter fleet 214, the capacitor bank array 216, and the plant-level electrical network 218 can be simulated representations of corresponding physical components within an electrical generation facility, where the optimization & control module 200 can evaluate configuration parameters or control strategies by modeling the behavior of the simulated components under various operating conditions. The optimization & control module 200 can transmit control signals to the simulated inverter fleet 214 or the simulated capacitor bank array 216 to determine reactive power compensation performance, power factor characteristics at the point of interconnection (POI) 220, or financial metrics associated with candidate configurations prior to physical implementation. The computational architecture of the optimization & control module 200 provides systematic evaluation capabilities that analyze thousands of potential equipment combinations to identify configurations that balance power factor compliance with economic performance objectives. The optimization & control module 200 incorporates data processing algorithms that access equipment databases, operational constraints, and interconnection requirements to perform comprehensive configuration analysis functions.

An inverter count iterator 202 comprises a computational component within the optimization & control module 200 configured to systematically evaluate different quantities of inverters for inclusion in facility configurations. The inverter count iterator 202 is configured to iterate through inverter counts from minimum values determined by power generation requirements up to maximum design capacity limits established by interconnection agreements or facility design constraints. In some cases, the inverter count iterator 202 accesses stored data regarding available inverter models, power ratings, and installation constraints to determine feasible ranges of inverter quantities for evaluation during the optimization process. The iteration process performed by the inverter count iterator 202 begins with the minimum number of inverters needed to meet basic power generation requirements and systematically increments the inverter count through intermediate values up to the maximum feasible quantity based on site capacity, interconnection limits, or economic constraints. The inverter count iterator 202 generates data sets that specify inverter quantities for subsequent evaluation by other components within the optimization & control module 200, where each inverter quantity represents a potential configuration option that requires further analysis to determine power factor characteristics and financial performance.

An inverter PF sweep 204 comprises a computational component configured to evaluate different power factor settings for each inverter quantity specified by the inverter count iterator 202. The inverter PF sweep 204 is configured to iterate through inverter power factors starting from highest permissible values and decreasing systematically to minimum allowable values based on manufacturer specifications for the selected inverter models. In some cases, the inverter PF sweep 204 accesses manufacturer data sheets and equipment specifications to determine the allowable power factor operating ranges for different inverter types, where the power factor ranges vary based on inverter design, cooling capabilities, and power semiconductor ratings. The power factor sweep process evaluates power factor settings in predetermined increments, such as 0.01 or 0.05 power factor units, to provide comprehensive coverage of the allowable operating range while maintaining computational efficiency during the optimization process. The inverter PF sweep 204 generates combinations of inverter quantities and power factor settings that represent the full range of feasible operating configurations for the inverter fleet 214, where each combination is passed to subsequent processing components for detailed power flow analysis and reactive power compensation sizing.

As further shown in FIG. 2, a POI power calculator 206 comprises a computational component configured to determine expected real and reactive power characteristics at the point of interconnection (POI) 220 for each combination of inverter quantity and power factor setting provided by the inverter PF sweep 204. The POI power calculator 206 incorporates mathematical models that simulate electrical losses throughout the plant-level electrical network 218, including conductor resistance losses, transformer core losses, transformer load losses, and inverter inefficiencies that affect power transmission from generation sources to the interconnection interface. In some cases, the POI power calculator 206 utilizes power flow calculation algorithms that account for voltage drops, current distributions, and impedance characteristics of electrical components within the facility to determine accurate power delivery predictions at the point of interconnection (POI) 220. The calculation functions performed by the POI power calculator 206 consider seasonal and diurnal variations in generation output, ambient temperature effects on equipment efficiency, and loading conditions that affect electrical losses throughout the plant-level electrical network 218. The POI power calculator 206 generates power flow results that specify expected real power output, reactive power characteristics, and apparent power levels at the point of interconnection (POI) 220 for each evaluated configuration, where the power flow results serve as input data for subsequent reactive power compensation analysis and cost evaluation functions.

A reactive compensation sizer 208 comprises a computational component configured to determine the size and configuration of reactive power compensation equipment needed to achieve target power factor values at the point of interconnection (POI) 220. The reactive compensation sizer 208 receives power flow data from the POI power calculator 206 and calculates the reactive power gap between the reactive power output capabilities of the inverter fleet 214 and the reactive power requirements imposed by power factor compliance standards at the point of interconnection (POI) 220. In some cases, the reactive compensation sizer 208 evaluates different arrangements of the capacitor bank array 216, including various combinations of fixed and switched capacitor banks that provide discrete reactive power compensation steps to bridge the reactive power gap. The sizing calculations performed by the reactive compensation sizer 208 consider the reactive power ratings of available capacitor bank units, voltage levels at capacitor bank connection points, and switching constraints that affect the granularity of reactive power control capabilities. The reactive compensation sizer 208 generates capacitor bank configuration specifications that define the number, size, and connection arrangement of capacitive elements needed to achieve power factor compliance for each combination of inverter quantity and power factor setting evaluated by the optimization process.

With continued reference to FIG. 2, a financial evaluator 210 comprises a computational component configured to assess the financial performance characteristics of each equipment configuration evaluated by the optimization process. The financial evaluator 210 receives configuration data from the reactive compensation sizer 208 and calculates comprehensive cost models that include capital expenditure requirements for inverter procurement, capacitor bank installation, electrical infrastructure, and associated balance-of-system components. In some cases, the financial evaluator 210 incorporates operational cost models that account for maintenance expenses, replacement costs, and efficiency losses associated with different equipment configurations over the projected facility lifetime. The financial analysis functions performed by the financial evaluator 210 include revenue projections based on expected real power delivery capabilities, where configurations that maximize real power output generate higher revenue streams compared to configurations that allocate inverter capacity primarily for reactive power compensation. The financial evaluator 210 calculates financial performance metrics including net present value, internal rate of return, and payback period for each evaluated configuration, where the financial metrics provide quantitative measures for comparing the economic attractiveness of different equipment arrangements. The cost evaluation process considers financing costs, tax implications, and depreciation schedules that affect the overall financial performance of capital investments in power generation and reactive power compensation equipment.

A configuration selector 212 comprises a computational component configured to identify the arrangement of equipment that provides the most favorable combination of technical compliance and financial performance among all configurations evaluated by the optimization process. The configuration selector 212 receives technical performance data from the reactive compensation sizer 208 and financial performance data from the financial evaluator 210 to perform multi-criteria decision analysis that balances power factor compliance with economic objectives. In some cases, the configuration selector 212 applies weighting factors or constraint functions that prioritize certain performance characteristics, such as maximizing real power delivery capability while maintaining power factor compliance within specified tolerance limits. The selection process performed by the configuration selector 212 includes filtering functions that eliminate configurations that fail to meet technical requirements, interconnection limits, or minimum financial performance thresholds before performing detailed comparison analysis among remaining viable options. The configuration selector 212 generates output data that specifies the selected inverter quantity, inverter power factor setting, and capacitor bank configuration for implementation within the electrical generation facility 100, where the selected configuration represents the arrangement that achieves the desired balance between technical performance and economic return. The configuration selector 212 provides control interface functions that transmit configuration parameters to the inverter fleet 214 and capacitor bank array 216 through communication pathways that enable implementation of the selected equipment arrangement.

The interaction between the computational components within the optimization & control module 200 provides a systematic evaluation framework that considers the full range of feasible equipment configurations while accounting for technical constraints, equipment limitations, and financial performance objectives. The sequential processing flow from the inverter count iterator 202 through the configuration selector 212 ensures comprehensive analysis of configuration options, where each processing stage adds additional technical detail and performance assessment capabilities to support informed decision-making regarding equipment selection and sizing. In some cases, the optimization & control module 200 incorporates feedback mechanisms that allow iterative refinement of configuration parameters based on updated equipment specifications, changed interconnection requirements, or modified financial performance criteria. The computational architecture provides scalable processing capabilities that accommodate facilities of different sizes and complexity levels, where the optimization algorithms are adapted to consider site-specific constraints, equipment availability, and regulatory requirements that affect configuration selection decisions for different types of electrical generation facilities.

Figure 3:
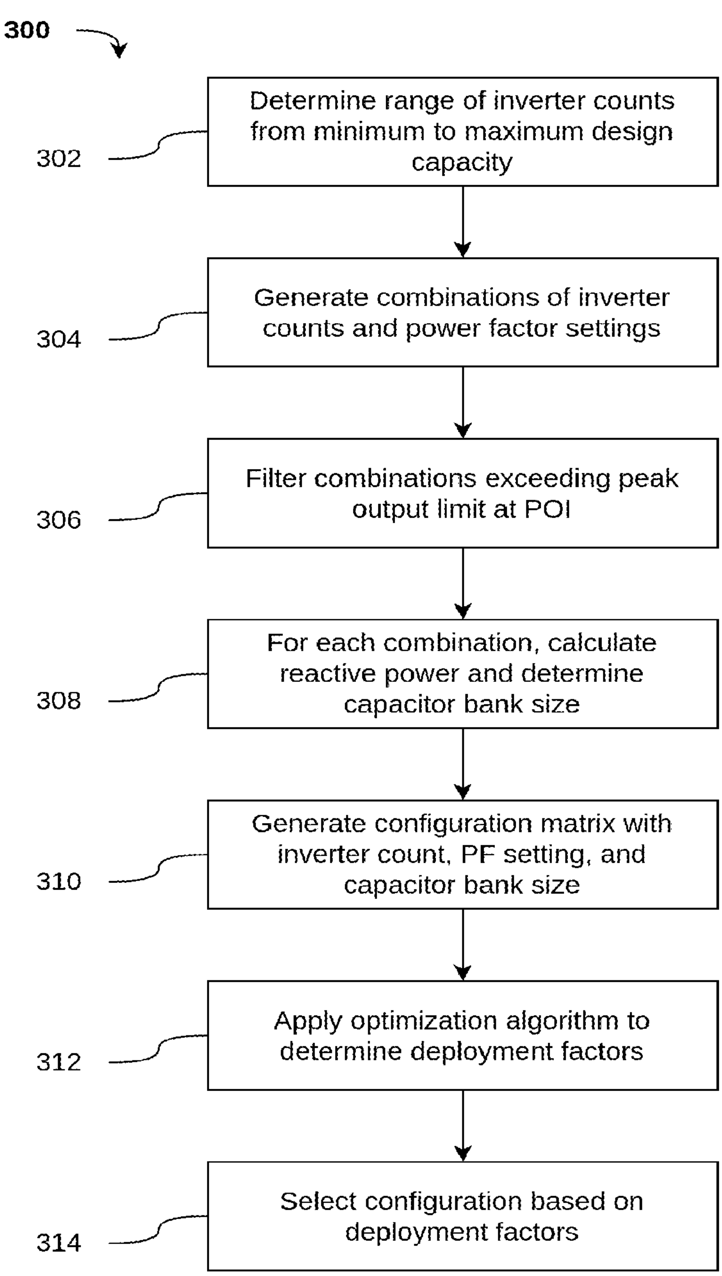
FIG. 3 illustrates a flowchart of a method for configuring the electrical generation facility to meet power factor requirements, according to aspects of the present disclosure.

FIG. 3 illustrates a flowchart of a method 300 for configuring the electrical generation facility to meet power factor requirements, according to aspects of the present disclosure. The method 300 may include more, fewer, or different operations than shown. The method 300 may be performed by the optimization & control module 128, the optimization & control module 200, or other computational systems configured to execute the configuration selection and optimization functions described herein.

A method can simulate various aspects of an electrical generation facility to determine an arrangement of an inverter fleet and a capacitor bank array that satisfies power factor requirements at a point of interconnection while achieving favorable financial performance characteristics. In some implementations, the method can model electrical losses through conductors, transformers, or a high-voltage transformer to predict power factor values at the point of interconnection for different combinations of inverter quantities, inverter power factor settings, or capacitor bank sizes, among others. In some implementations, the method can simulate control of the electrical generation facility by modeling coordinated operation of inverters and a capacitor bank array under varying generation conditions, load patterns, or grid operating requirements to determine performance characteristics of various configurations in real-world circumstances. The method can reduce computational resources by filtering infeasible configurations prior to performing detailed reactive power calculations or financial analysis. In some implementations, the method can identify configurations that minimize capital expenditure for reactive power compensation equipment by prioritizing the use of inverter reactive power capability before adding supplemental capacitor bank compensation from the capacitor bank array.

At operation 302, a range of inverter counts is determined from a minimum quantity to a maximum design capacity for the electrical generation facility. The minimum quantity can be established based on the minimum number of inverters needed to meet basic power generation requirements for the facility. The maximum design capacity can be determined based on site capacity constraints, interconnection limits specified by utility agreements, or economic constraints related to capital expenditure budgets. For example, a facility with a 100 megawatt alternating current interconnection limit and inverters rated at 2.5 megawatts each may have a maximum inverter count of 40 units. The range of inverter counts provides the foundation for subsequent iterative analysis of equipment configurations throughout the method 300.

At operation 304, a plurality of combinations of inverter counts and inverter power factor settings is generated. The inverter power factor settings range from a highest permissible power factor to a minimum permissible power factor based on manufacturer specifications for the selected inverter models. For example, inverter power factor settings may range from 0.95 lagging to 0.85 lagging based on manufacturer-specified operating limits for a particular inverter model. The combinations are generated by pairing each inverter count within the determined range with each power factor setting within the permissible range. The generation of the combinations of inverter counts and power factor settings provides a set of potential inverter operating configurations for evaluation in subsequent operations of the method 300.

At operation 306, combinations where a product of the inverter count and an active power output at the corresponding inverter power factor setting exceeds a peak output limit at the point of interconnection of the electrical generation facility are filtered from the plurality of combinations to generate a modified plurality of combinations. The filtering operation removes configurations that would violate interconnection agreements or exceed transmission capacity limits established by the interconnecting authority. For example, a combination of 45 inverters operating at a power factor of 0.95 may be filtered if the resulting active power output of 107 megawatts exceeds a 100 megawatt peak output limit at the point of interconnection. The modified plurality of combinations includes configurations that satisfy the peak output constraint while providing a range of inverter quantities and power factor settings for further analysis. The filtering operation reduces computational requirements for subsequent operations by eliminating infeasible configurations from consideration.

At operation 308, for each combination of inverter count and power factor setting of the modified plurality of combinations, a total reactive power contribution from the inverters is calculated, a plant-level power factor is determined based on the total reactive power contribution from the inverters by determining real and reactive losses across components of the electrical generation facility, and a capacitor bank size is determined to address a remaining gap in reactive power needed to meet the power factor requirement at the point of interconnection. The total reactive power contribution is calculated based on the reactive power output characteristics of each inverter operating at the specified power factor setting. The plant-level power factor determination accounts for losses that occur as power flows through the electrical infrastructure from the inverters to the point of interconnection. The capacitor bank size is determined to provide supplemental reactive power compensation that bridges the gap between the reactive power provided by the inverters and the reactive power needed to achieve the target power factor at the point of interconnection. For example, if the inverters provide 30 megavolt-amperes reactive and the target power factor requires 45 megavolt-amperes reactive at the point of interconnection, a capacitor bank size of 15 megavolt-amperes reactive may be determined to address the remaining gap.

In some implementations, determining the real and reactive losses across the components of the electrical generation facility comprises modeling losses from conductor wire losses, inverter inefficiencies, medium-voltage transformer losses, and high-voltage transformer losses. Conductor wire losses are calculated based on the resistance of electrical conductors and the current flowing through the conductors, where the losses vary with conductor length, cross-sectional area, and material properties. Inverter inefficiencies account for power conversion losses that occur during the transformation of direct current power to alternating current power within each inverter unit. Medium-voltage transformer losses include core losses and load losses that occur in transformers operating at voltage levels between approximately 4 kilovolts and 35 kilovolts within the power collection infrastructure. High-voltage transformer losses include no-load losses and load losses that occur in the main power transformer that provides voltage transformation between the medium-voltage transformers and high-voltage transmission levels for grid interconnection.

In some implementations, determining the capacitor bank size to address the remaining gap in reactive power needed to meet the power factor requirement at the point of interconnection for each inverter count includes determining a minimum capacitor bank size needed to meet the power factor requirement at the point of interconnection. The minimum capacitor bank size is calculated based on the difference between the reactive power provided by the inverter fleet at the specified power factor setting and the reactive power required to achieve the target power factor at the point of interconnection. For example, if the target power factor at the point of interconnection is 0.95 leading and the inverter fleet provides reactive power corresponding to a power factor of 0.92 leading, the minimum capacitor bank size is determined to provide the additional reactive power needed to achieve the 0.95 power factor target. The determination of minimum capacitor bank size minimizes capital expenditure for reactive power compensation equipment while maintaining compliance with interconnection requirements. The minimum capacitor bank size determination prioritizes meeting real power needs with inverters before using capacitor banks to satisfy remaining reactive power requirements.

At operation 310, a configuration matrix is generated comprising a plurality of configurations for the electrical generation facility, wherein each configuration includes a combination of inverter count and power factor setting from the modified plurality of combinations and a corresponding capacitor bank size. The configuration matrix provides a tabulated representation of all viable equipment configurations that satisfy the power factor requirement at the point of interconnection. For example, the configuration matrix may include 200 configurations representing different combinations of 30 to 40 inverters, power factor settings from 0.85 to 0.95, and capacitor bank sizes from 0 to 50 megavolt-amperes reactive. Each row or column of the configuration matrix corresponds to a specific equipment arrangement that achieves power factor compliance through a particular combination of inverter reactive power contribution and capacitor bank compensation. The configuration matrix serves as the input data structure for subsequent optimization and selection operations that identify the most favorable configuration based on deployment factors.

In some implementations, each column in the configuration matrix is optimized to mitigate costs. The optimization of each column reduces capital expenditure requirements by identifying the most cost-effective combination of inverter power factor setting and capacitor bank size for each inverter count. For example, for a column corresponding to 35 inverters, the optimization process evaluates different power factor settings and corresponding capacitor bank sizes to identify the combination that minimizes total equipment costs while maintaining power factor compliance. The column optimization process considers the relative costs of inverter capacity allocation for reactive power versus capacitor bank installation costs. The optimization of each column provides a refined set of configurations that represent cost-effective solutions for each inverter quantity within the configuration matrix.

In some implementations, optimizing each column in the configuration matrix comprises, for each inverter count, selecting an inverter power factor setting that minimizes the capacitor bank size needed to meet the power factor requirement at the point of interconnection. The selection of the inverter power factor setting that minimizes capacitor bank size reduces capital expenditure for reactive power compensation equipment. For example, for a configuration with 38 inverters, an inverter power factor setting of 0.90 may require a capacitor bank size of 10 megavolt-amperes reactive, while an inverter power factor setting of 0.88 may require a capacitor bank size of 5 megavolt-amperes reactive, and the 0.88 power factor setting is selected to minimize the capacitor bank size. The minimization of capacitor bank size prioritizes the use of inverter reactive power capability before adding supplemental capacitor bank compensation. The selection process balances the reactive power contribution from inverters against the capital cost of capacitor bank equipment to achieve cost-effective power factor compliance.

At operation 312, an optimization algorithm is applied to the configuration matrix to determine deployment factors for each configuration of the plurality of configurations. The optimization algorithm evaluates each configuration based on multiple performance criteria that affect the technical and financial viability of the equipment arrangement. The deployment factors provide quantitative measures for comparing different configurations and identifying the arrangement that achieves the desired balance between technical compliance and economic performance. For example, the optimization algorithm may calculate deployment factors including initialization cost, expected energy production, and financial return for each configuration in the configuration matrix. The determination of deployment factors enables informed decision-making regarding equipment selection by providing comprehensive performance assessments for each viable configuration.

In some implementations, the deployment factors include initialization cost, expected energy production, and financial return. Initialization cost comprises capital expenditure requirements for inverter procurement, capacitor bank installation, electrical infrastructure, and associated balance-of-system components. Expected energy production is calculated based on the real power delivery capabilities of each configuration, accounting for inverter power ratings, power factor settings, and electrical losses throughout the facility. Financial return is determined based on revenue projections from energy sales, capital costs, operational expenses, and the time value of money over the projected facility lifetime. For example, a configuration with 36 inverters, a power factor setting of 0.92, and a capacitor bank size of 8 megavolt-amperes reactive may have an initialization cost of 45 million dollars, expected annual energy production of 200 gigawatt-hours, and a financial return expressed as a net present value of 25 million dollars.

In some implementations, the financial return includes at least one of net present value, internal rate of return, or payback period. Net present value is calculated by discounting future cash flows from energy sales and subtracting initial capital expenditures to determine the present value of the investment. Internal rate of return is determined as the discount rate at which the net present value of the investment equals zero, providing a percentage measure of investment profitability. Payback period is calculated as the time required for cumulative cash flows from energy sales to equal the initial capital expenditure. For example, a configuration may have a net present value of 30 million dollars, an internal rate of return of 12 percent, and a payback period of 7 years. The financial return metrics provide multiple perspectives on the economic attractiveness of each configuration to support investment decision-making.

In some implementations, the deployment factors include a direct current-to-alternating current ratio for the electrical generation facility. The direct current-to-alternating current ratio is calculated as the ratio of the total direct current power capacity of generation sources to the total alternating current power capacity of the inverter fleet. For example, a facility with 120 megawatts of direct current solar panel capacity and 100 megawatts of alternating current inverter capacity has a direct current-to-alternating current ratio of 1.2. The direct current-to-alternating current ratio affects the amount of power clipping that occurs when available direct current power exceeds inverter alternating current capacity. The inclusion of the direct current-to-alternating current ratio in the deployment factors enables evaluation of configurations based on power utilization efficiency and clipping losses.

In some implementations, the electrical generation facility is a solar power plant, and the deployment factors further include solar clipping at the inverters and the point of interconnection based on the direct current-to-alternating current ratio. Solar clipping at the inverters occurs when the direct current power output from solar panels exceeds the alternating current power rating of the inverters, resulting in curtailment of excess power generation. Solar clipping at the point of interconnection occurs when the total alternating current power output from the inverter fleet exceeds the peak output limit established by interconnection agreements. For example, a solar power plant with a direct current-to-alternating current ratio of 1.3 may experience inverter clipping during peak solar irradiance periods when direct current power output exceeds inverter capacity by 30 percent. The inclusion of solar clipping in the deployment factors enables evaluation of configurations based on the trade-off between higher direct current-to-alternating current ratios that increase energy capture during low irradiance periods and increased clipping losses during high irradiance periods.

In some implementations, the deployment factors include revenue impact from real power delivery affected by the solar clipping. The revenue impact is calculated based on the amount of energy lost due to solar clipping and the value of the lost energy at applicable electricity prices. For example, a configuration with a direct current-to-alternating current ratio of 1.25 may experience annual clipping losses of 5 gigawatt-hours, resulting in a revenue impact of 250,000 dollars at an electricity price of 50 dollars per megawatt-hour. The revenue impact from solar clipping is incorporated into financial return calculations to provide accurate assessments of the economic performance of each configuration. The inclusion of revenue impact in the deployment factors enables selection of configurations that balance increased energy capture from higher direct current-to-alternating current ratios against revenue losses from clipping.

In some implementations, the deployment factors can be determined by simulating performance of the electrical generation facility under various operating conditions. The simulation can model power generation output, electrical losses, reactive power flows, or power factor characteristics at the point of interconnection (POI) 126 over a representative time period, among others. For example, the simulation can execute hourly or sub-hourly calculations over multiple years to capture seasonal variations in solar irradiance, ambient temperature effects on equipment efficiency, or load patterns that affect facility performance. The simulation can receive input data including weather data, equipment specifications, electrical network parameters, or interconnection requirements to generate performance projections for each configuration in the configuration matrix. The simulation-based determination of deployment factors provides data-driven assessments that account for temporal variations in operating conditions rather than relying on static calculations based on peak or average conditions.

In some implementations, the optimization & control module 128 can execute the simulation of the electrical generation facility to determine the deployment factors for each configuration. The optimization & control module 128 can access stored equipment models, loss calculation algorithms, or historical weather data to perform time-series simulations that project facility performance over the expected operating lifetime. For example, the optimization & control module 128 can simulate a configuration with 37 inverters operating at a power factor setting of 0.91 and a capacitor bank size of 12 megavolt-amperes reactive by calculating, for each time step, the direct current power available from solar panels, the alternating current power output after inverter conversion, the electrical losses through the plant-level electrical network 116, or the power factor achieved at the point of interconnection (POI) 126. The simulation can aggregate the time-step results to determine annual energy production, total clipping losses, or revenue projections that form the basis for the deployment factors associated with the configuration.

In some implementations, the simulation can model the coordinated operation of the inverter fleet 102 and the capacitor bank array 110 to determine reactive power compensation performance under varying generation conditions. The simulation can calculate the reactive power output from each inverter at the specified power factor setting, the reactive power contribution from connected capacitor banks, or the net reactive power delivered to the point of interconnection (POI) 126 after accounting for reactive losses in the conductors 118, transformers 120, or high-voltage transformer 124. For example, the simulation can evaluate a scenario where morning generation ramp-up causes the power factor at the point of interconnection (POI) 126 to deviate from the target value, and the simulation can model the response of the optimization & control module 128 in adjusting inverter power factor settings or actuating switchgear to connect additional capacitor banks to restore compliance. The simulation results can indicate the frequency or duration of power factor excursions, the control actions required to maintain compliance, or the impact on real power delivery for each evaluated configuration.

At operation 314, a configuration is selected from the configuration matrix based on the deployment factors for each configuration of the plurality of configurations. The selection process identifies the configuration that provides the most favorable combination of technical compliance and financial performance among all configurations in the configuration matrix. For example, the configuration with the highest net present value among configurations that satisfy all technical constraints may be selected as the optimal equipment arrangement. The selected configuration specifies the inverter quantity, inverter power factor setting, and capacitor bank size for implementation within the electrical generation facility. The selection of the configuration based on deployment factors provides a data-driven approach to equipment sizing that balances power factor compliance with economic performance objectives.

In some implementations, the selection of the configuration from the configuration matrix comprises applying a ranking function that orders the plurality of configurations according to a weighted combination of the deployment factors. The ranking function can assign weighting coefficients to each deployment factor based on priorities specified by facility developers or operators, where higher weighting coefficients indicate greater importance in the selection process. For example, a ranking function may assign a weighting coefficient of 0.5 to net present value, a weighting coefficient of 0.3 to initialization cost, and a weighting coefficient of 0.2 to expected energy production, among others. The ranking function can generate a composite score for each configuration by multiplying each deployment factor by the corresponding weighting coefficient and summing the weighted values. The configuration with the highest composite score can be selected as the configuration that provides the most favorable balance among the deployment factors according to the specified priorities.

In some implementations, the selection of the configuration from the configuration matrix comprises applying constraint-based filtering followed by optimization-based selection. The constraint-based filtering can remove configurations that fail to satisfy one or more threshold requirements, such as a maximum initialization cost threshold, a minimum expected energy production threshold, or a minimum financial return threshold, among others. For example, configurations with an initialization cost exceeding 50 million dollars or a net present value below 20 million dollars may be filtered from consideration prior to optimization-based selection. The optimization-based selection can identify the configuration among the remaining configurations that maximizes or minimizes a selected deployment factor, such as selecting the configuration that maximizes net present value or minimizes payback period. The combination of constraint-based filtering and optimization-based selection provides a configuration selection approach that satisfies minimum performance requirements while optimizing for a primary objective.

The method 300 provides technical improvements over conventional approaches to equipment sizing for electrical generation facilities by integrating power factor compliance analysis with financial optimization in a unified computational framework. The method 300 can reduce the time and computational resources required to evaluate equipment configurations by systematically filtering infeasible combinations at operation 306 prior to performing detailed reactive power calculations and financial analysis. In an example, the method 300 can improve the accuracy of equipment sizing decisions by modeling real and reactive losses across the conductors 118, transformers 120, and high-voltage transformer 124 to determine plant-level power factor characteristics that account for the cumulative effects of electrical infrastructure on power delivery to the point of interconnection (POI) 126. The method 300 can enable facility developers to identify configurations that achieve power factor compliance while maximizing financial return, rather than relying on predetermined equipment sizing rules or engineering margins that may result in over-provisioning of reactive power compensation equipment. The method 300 can reduce capital expenditure requirements by determining the minimum capacitor bank size needed to meet power factor requirements for each inverter count, where the prioritization of inverter reactive power contribution before supplemental capacitor bank deployment minimizes equipment costs without compromising technical compliance. The method 300 can improve the utilization of inverter capacity by evaluating the trade-offs between allocating inverter capacity for reactive power compensation versus maximizing real power delivery, where the deployment factors capture the revenue impact of different power factor settings on energy production and clipping losses.

In some implementations, the method 300 can further reduce computational requirements by filtering configurations with higher capacitor bank sizes at the same inverter count prior to financial analysis. For each inverter count, the method 300 can identify the configuration with the minimum capacitor bank size that satisfies the power factor requirement at the point of interconnection and exclude configurations with larger capacitor bank sizes from subsequent financial evaluation. For example, a first configuration with 70 inverters operating at a power factor of 0.80 and a capacitor bank size of 10 megavolt-amperes reactive may be retained for financial analysis, while a second configuration with 70 inverters operating at a power factor of 0.84 and a capacitor bank size of 20 megavolt-amperes reactive may be filtered from consideration because the larger capacitor bank size represents unnecessary capital expenditure without corresponding benefit. The filtering of higher capacitor bank configurations at each inverter count reduces the number of configurations evaluated by the financial evaluator 210 from hundreds or thousands of technically compliant configurations to a single configuration per inverter count. In an example, a facility design process that generates 500 configurations meeting power factor requirements at the point of interconnection (POI) 126 may be reduced to approximately 30 configurations for financial analysis, where each retained configuration represents the minimum capacitor bank size for a particular inverter count within the feasible range. The reduction in configurations evaluated by the financial engine decreases optimization time while ensuring that the selected configuration achieves power factor compliance at minimum capital cost for reactive power compensation equipment.

Figure 4:
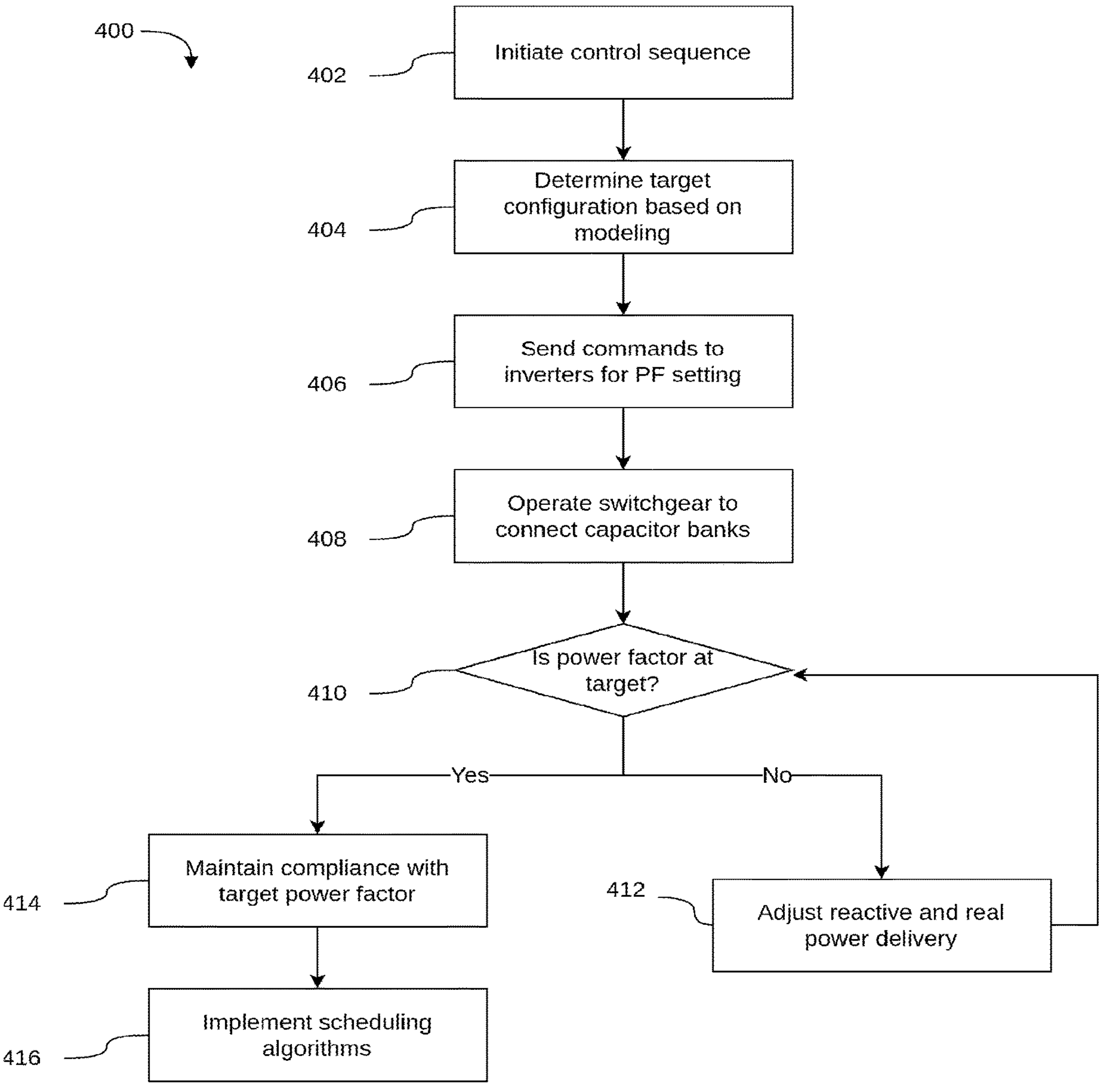
FIG. 4 illustrates a flowchart of a process for dynamically achieving target power factor in the electrical generation facility, according to an embodiment.

Referring to FIG. 4, a dynamic power factor achievement process is implemented to maintain continuous compliance with power factor requirements at the point of interconnection (POI) 126 through real-time monitoring and adjustment of reactive power compensation equipment. The dynamic process provides automated control capabilities that respond to changing generation conditions, load variations, and grid operating requirements that affect reactive power balance within the electrical generation facility 100. In some cases, the dynamic process incorporates feedback control algorithms that continuously compare measured power factor values with target power factor requirements and generate corrective control actions when deviations exceed predetermined tolerance limits. The process utilizes the optimization & control module 128 to coordinate adjustments of the inverter fleet 102 and capacitor bank array 110 based on real-time electrical measurements and predetermined control strategies. The dynamic nature of the process allows the facility to maintain power factor compliance under varying operating conditions while adapting to changes in generation output, equipment availability, and interconnection requirements that occur during normal facility operations.

In some implementations, the method 400 can be performed as part of a simulation of the electrical generation facility 100 to evaluate the dynamic control performance of candidate configurations prior to physical implementation. The optimization & control module 128 can execute the method 400 within a simulated environment that models the behavior of the inverter fleet 102, the capacitor bank array 110, or the plant-level electrical network 116 under time-varying generation conditions. For example, the simulation can model a candidate configuration with a specified inverter quantity, inverter power factor setting, or capacitor bank size, and the simulation can execute the steps of the method 400 to determine how the configuration responds to changes in solar irradiance, ambient temperature, or grid voltage conditions that affect power factor characteristics at the point of interconnection (POI) 126. The simulation can track the frequency of control actions at operation 410, the magnitude of reactive power adjustments at 412, or the duration of power factor excursions that occur before compliance is restored at operation 414. The simulation-based execution of the method 400 provides performance metrics that characterize the dynamic behavior of each candidate configuration under realistic operating scenarios.

In some implementations, the optimization & control module 128 can use simulation results from the method 400 to refine the selection of a configuration from the configuration matrix generated by the method 300. The simulation can execute the method 400 for multiple candidate configurations identified during the method 300, and the simulation can generate comparative data regarding control responsiveness, power factor stability, or real power delivery under dynamic conditions for each configuration. For example, the simulation can determine that a first configuration with 36 inverters operating at a power factor setting of 0.90 requires more frequent capacitor bank switching operations than a second configuration with 38 inverters operating at a power factor setting of 0.92, and the optimization & control module 128 can incorporate the switching frequency data into the deployment factors used for configuration selection. The integration of the method 400 into the simulation framework provides that the selected configuration achieves favorable performance under both steady-state conditions evaluated by the method 300 and dynamic conditions evaluated by the method 400.

The method 400 for the dynamic power factor achievement process begins with operation 402. At operation 402, a control sequence for implementing target power factor compliance at the point of interconnection (POI) 126 is initiated. At operation 402, communication pathways between monitoring systems and control equipment are established to enable real-time data exchange and command transmission throughout the facility. In some implementations, operation 402 involves initializing control algorithms within the optimization & control module 128 that access stored configuration parameters, equipment specifications, or operational constraints for managing power factor control functions. At operation 402, measurement systems at the point of interconnection (POI) 126 are activated to provide continuous monitoring of electrical parameters including real power, reactive power, voltage levels, or power factor values, among others. The initialization functions performed at operation 402 establish baseline operating conditions and reference parameters that serve as targets for subsequent control actions throughout the dynamic adjustment process.

Following the initialization phase, the process proceeds to an operation 404 that comprises determining the target configuration based on modeling results from the optimization & control module 128. The operation 404 accesses previously calculated configuration parameters that specify the arrangement of inverter quantities, power factor settings, and capacitor bank sizes that achieve power factor compliance while meeting financial performance objectives. In some implementations, the operation 404 incorporates updated modeling calculations that account for current operating conditions, equipment availability, and generation forecasts that affect the selection of target configuration parameters. The operation 404 evaluates multiple candidate configurations to identify the arrangement that provides the most favorable balance between power factor compliance and operational efficiency under current facility conditions. The target configuration determined in the operation 404 serves as the reference point for subsequent control actions that adjust equipment operating parameters to achieve the desired power factor characteristics at the point of interconnection (POI) 126.

The process continues with an operation 406 that comprises sending commands to the inverter fleet 102 for power factor setting adjustments based on the target configuration established in the operation 404. The operation 406 generates control signals that specify power factor operating points for the first inverter 104, second inverter 106, and nth inverter 108 to achieve the reactive power output characteristics defined in the target configuration. In some implementations, the operation 406 uses digital communication protocols that provide reliable command transmission between the optimization & control module 128 and individual inverter control systems within the inverter fleet 102. The operation 406 includes verification functions that confirm successful receipt and implementation of power factor adjustment commands by each inverter unit. The control commands transmitted in the operation 406 specify different power factor settings for different inverters within the inverter fleet 102, where distributed power factor control provides flexibility in managing reactive power distribution across the facility while achieving the overall power factor target.

As further shown in FIG. 4, the process proceeds to an operation 408 that comprises operating switchgear to connect capacitor banks of the specified size to the electrical network of the electrical generation facility 100. The operation 408 generates control signals that actuate motor-operated switches or contactors associated with the capacitor bank 112 and second capacitor bank 114 to achieve the reactive power compensation characteristics defined in the target configuration. In some implementations, the operation 408 coordinates the timing of switchgear operations with the inverter power factor adjustments from the operation 406 to provide smooth transitions between different reactive power compensation states without causing power quality disturbances or voltage excursions. The operation 408 incorporates protective interlocking features that prevent unsafe switching operations and ensure proper coordination between capacitor bank connection states and system operating conditions. The switchgear operation functions at operation 408 include status monitoring capabilities that verify successful completion of switching operations and provide feedback regarding the operational status of reactive power compensation equipment within the capacitor bank array 110.

The dynamic process incorporates a decision point represented by an operation 410 that comprises checking whether the power factor measured at the point of interconnection (POI) 126 matches the target power factor established in the target configuration. The operation 410 compares real-time power factor measurements obtained from monitoring equipment at the point of interconnection (POI) 126 with predetermined target values to determine whether the implemented configuration achieves the desired power factor characteristics. In some implementations, the operation 410 incorporates tolerance bands around the target power factor values to account for measurement uncertainties and normal variations in electrical system conditions that cause minor fluctuations in power factor measurements. The operation 410 can use digital signal processing algorithms that filter measurement data to reduce the effects of transient disturbances or measurement noise that could cause false indications of power factor deviations. The comparison functions performed at operation 410 generate binary decision outputs that direct the process flow toward either compliance maintenance functions or corrective adjustment procedures based on the measured power factor characteristics.

When the operation 410 determines that the measured power factor does not match the target power factor, the process proceeds to an operation 412 that comprises adjusting reactive and real power delivery to correct the power factor deviation. The operation 412 implements corrective control algorithms that modify the operating parameters of the inverter fleet 102 and capacitor bank array 110 to bring the measured power factor closer to the target value established in the target configuration. In some implementations, the operation 412 adjusts inverter power factor settings incrementally to provide fine-tuning of reactive power output without causing abrupt changes in electrical system conditions. The operation 412 evaluates whether additional capacitor bank switching operations provide more effective reactive power compensation compared to inverter power factor adjustments alone. The corrective actions implemented at operation 412 prioritize maintaining real power delivery capabilities while achieving power factor compliance, where the adjustments optimize the balance between real and reactive power output to maintain revenue generation while meeting interconnection standards. Following the implementation of corrective adjustments at operation 412, the process returns to the operation 410 to reassess power factor compliance and determine whether additional corrective actions are warranted.

With continued reference to FIG. 4, when the operation 410 determines that the measured power factor matches the target power factor within acceptable tolerance limits, the process proceeds to an operation 414 that comprises maintaining compliance with the target power factor through continuous monitoring and minor adjustments as needed. The operation 414 implements steady-state control functions that monitor power factor measurements and equipment operating parameters to ensure continued compliance with interconnection requirements under normal operating conditions. In some implementations, the operation 414 incorporates predictive algorithms that anticipate changes in generation output or electrical system conditions and proactively adjust reactive power compensation to prevent power factor excursions before they occur. The operation 414 maintains historical records of power factor measurements and control actions to support performance analysis and regulatory reporting requirements for the electrical generation facility 100. The compliance maintenance functions in the operation 414 provide adaptive capabilities that respond to gradual changes in equipment performance, seasonal variations in generation patterns, or evolving interconnection requirements that affect power factor characteristics over extended operating periods.

The dynamic power factor achievement process concludes with an operation 416 that comprises operating the facility in accordance with a time-varying schedule to adjust inverter power factor settings and capacitor bank connections based on predicted generation and load conditions. The operation 416 implements scheduling algorithms that anticipate daily, seasonal, and weather-related variations in power generation output and adjust reactive power compensation strategies accordingly to maintain power factor compliance under changing operating conditions. In some implementations, the operation 416 accesses weather forecasting data, generation prediction models, and historical operating patterns to develop time-varying schedules that optimize reactive power management strategies for anticipated facility operating conditions. The operation 416 coordinates scheduled adjustments with real-time feedback control functions to provide comprehensive power factor management that combines predictive scheduling with responsive correction capabilities. The time-varying schedule implemented at operation 416 accounts for equipment maintenance requirements, seasonal changes in electrical system losses, and variations in interconnection requirements that affect power factor compliance strategies throughout different operating periods. The scheduled operation functions at operation 416 provide long-term optimization of reactive power management while maintaining the flexibility to respond to unexpected changes in generation conditions or grid operating requirements that occur during facility operations.

Figure 5:
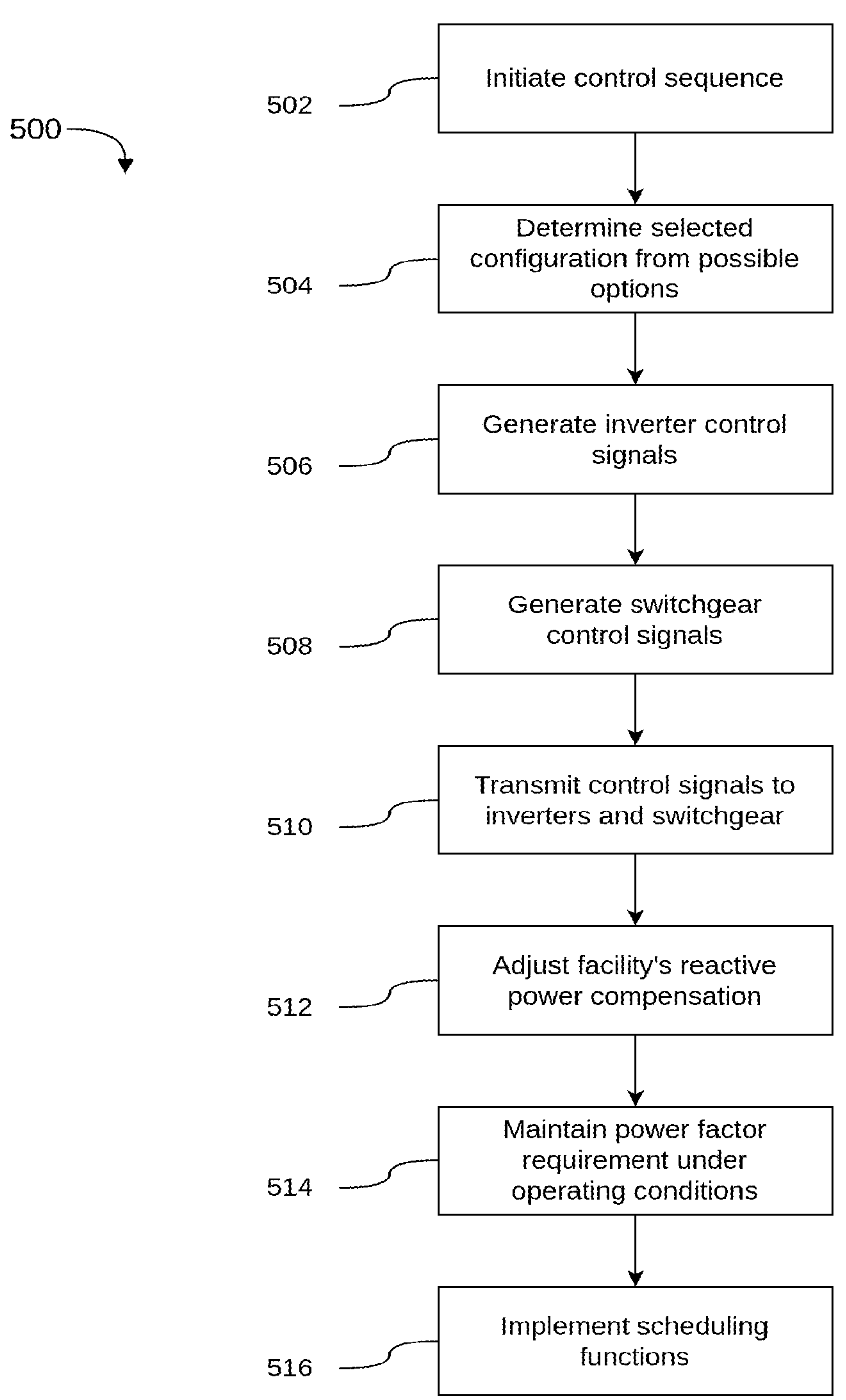
FIG. 5 illustrates a flowchart of a process for controlling inverter operation and capacitor bank deployment in the electrical generation facility, according to aspects of the present disclosure.

Referring to FIG. 5, a control signal generation and implementation process is executed to manage operations of reactive power compensation equipment within the electrical generation facility 100. The process provides systematic control capabilities that translate configuration selection decisions into specific control actions that modify the operating characteristics of the inverter fleet 102 and the capacitor bank array 110. In some cases, the control signal generation process is implemented through the optimization & control module 128, where computational algorithms generate precise control commands that coordinate the operation of multiple equipment types to achieve power factor compliance at the point of interconnection (POI) 126. The process incorporates communication protocols and signal transmission functions that ensure reliable delivery of control commands to distributed equipment throughout the plant-level electrical network 116. The control signal generation and implementation process provides the interface between configuration optimization functions and physical equipment operation, where the process translates abstract configuration parameters into concrete control actions that adjust reactive power compensation characteristics.

In some implementations, the method 500 can be performed as a simulation of control operations for the electrical generation facility 100 to evaluate the performance characteristics of candidate configurations prior to physical implementation. The optimization & control module 128 can execute the method 500 within a simulated environment that models the behavior of the inverter fleet 102, the capacitor bank array 110, or the plant-level electrical network 116 under time-varying generation conditions, load patterns, or grid operating requirements. For example, the simulation can model a candidate configuration with a specified inverter quantity, inverter power factor setting, or capacitor bank size, and the simulation can execute the operations of the method 500 to determine how the configuration responds to changes in solar irradiance, ambient temperature, or grid voltage conditions that affect power factor characteristics at the point of interconnection (POI) 126. The simulation can track the frequency of control signal generation at operation 506, the magnitude of switchgear control signals at operation 508, or the duration of power factor deviations that occur before compliance is restored at operation 514. The simulation-based execution of the method 500 provides performance metrics that characterize the control responsiveness of each candidate configuration under realistic operating scenarios.

In some implementations, the optimization & control module 128 can use simulation results from the method 500 to refine the selection of a configuration from the configuration matrix generated by the method 300. The simulation can execute the method 500 for multiple candidate configurations identified during the method 300, and the simulation can generate comparative data regarding control signal frequency, reactive power adjustment magnitude, or power factor stability under dynamic conditions for each configuration. For example, the simulation can determine that a first configuration with 36 inverters operating at a power factor setting of 0.90 requires more frequent switchgear operations than a second configuration with 38 inverters operating at a power factor setting of 0.92, and the optimization & control module 128 can incorporate the switching frequency data into the deployment factors used for configuration selection at operation 314. The integration of the method 500 into the simulation framework provides that the selected configuration achieves favorable performance under both steady-state conditions evaluated by the method 300 and dynamic control conditions evaluated by the method 500.

The control signal generation process begins with operation 502 that initiates the control sequence for implementing the selected equipment configuration within the electrical generation facility 100. The operation 502 establishes communication pathways and initializes control algorithms that access stored configuration parameters determined through previous optimization analysis functions. In some cases, the operation 502 activates monitoring systems and control interfaces that provide real-time data exchange capabilities between the optimization & control module 128 and field equipment including the first inverter 104, the second inverter 106, the nth inverter 108, the capacitor bank 112, and the second capacitor bank 114. The operation 502 verifies the operational status of communication networks and control equipment to ensure that subsequent control signal transmission functions operate reliably throughout the implementation process. The initialization functions performed in the operation 502 establish baseline operating conditions and reference parameters that serve as starting points for the control signal generation and equipment adjustment procedures that follow in subsequent process steps.

Following the initialization phase, the process proceeds to an operation 504 that comprises determining, from a plurality of possible configurations, a selected configuration including a number of inverters, an inverter power factor setting, and a capacitor bank size that satisfies the power factor requirement at the point of interconnection (POI) 126. The operation 504 accesses previously calculated configuration parameters that specify the arrangement of equipment quantities and operating settings that achieve power factor compliance while meeting financial performance objectives established during the optimization process. In some cases, the operation 504 incorporates real-time assessment functions that evaluate current operating conditions, equipment availability, and generation forecasts to confirm that the selected configuration remains appropriate for implementation under current facility conditions. The operation 504 validates that the selected configuration parameters fall within acceptable operating ranges for the available equipment, where the validation process checks inverter power factor capabilities against manufacturer specifications and verifies that capacitor bank sizes correspond to available reactive power compensation equipment within the capacitor bank array 110. The selected configuration determined in the operation 504 serves as the reference specification for subsequent control signal generation functions that translate the configuration parameters into specific control commands for individual equipment units throughout the facility.

The process continues with an operation 506 that comprises generating inverter control signals to configure the plurality of inverters to operate at the inverter power factor setting specified in the selected configuration. The operation 506 creates digital control messages that specify power factor operating points for the first inverter 104, the second inverter 106, and the nth inverter 108 to achieve the reactive power output characteristics defined in the selected configuration. In some cases, the operation 506 generates different control signals for different inverters within the inverter fleet 102, where distributed power factor control provides flexibility in managing reactive power distribution across multiple equipment units while achieving the overall power factor target at the point of interconnection (POI) 126. The operation 506 incorporates signal formatting functions that encode control commands according to communication protocol specifications used by individual inverter control systems, where the signal formatting ensures compatibility between the optimization & control module 128 and various inverter models that are installed within the facility. The inverter control signals generated in the operation 506 include verification codes, timing parameters, and safety interlocks that ensure proper implementation of power factor adjustments while maintaining safe operating conditions for the power conversion equipment.

As further shown in FIG. 5, the process proceeds to an operation 508 that comprises generating switchgear control signals to connect capacitor banks of the capacitor bank size to the facility's electrical network. The operation 508 creates control commands that specify switching operations for motor-operated switches or contactors associated with the capacitor bank 112 and the second capacitor bank 114 to achieve the reactive power compensation characteristics defined in the selected configuration. In some cases, the operation 508 coordinates the timing and sequencing of switchgear operations to provide smooth transitions between different reactive power compensation states without causing power quality disturbances or voltage excursions that could affect other equipment within the plant-level electrical network 116. The operation 508 incorporates protective interlocking functions that prevent unsafe switching operations and ensure proper coordination between capacitor bank connection states and system operating conditions measured throughout the electrical network. The switchgear control signals generated in the operation 508 include position commands, timing delays, and status verification requirements that ensure reliable operation of switching equipment while providing feedback regarding the operational status of reactive power compensation equipment within the capacitor bank array 110.

The control signal generation process continues with an operation 510 that comprises transmitting the control signals to inverters and switchgear through communication interfaces that provide reliable data exchange between control systems and field equipment. The operation 510 utilizes industrial control network protocols that support multiple communication technologies including Ethernet-based protocols, serial communication standards, and wireless communication systems that facilitate control signal transmission across the distributed equipment within the electrical generation facility 100. In some cases, the operation 510 incorporates redundant communication paths that provide backup communication capabilities during primary communication system failures or maintenance operations that could affect control signal transmission reliability. The operation 510 includes data integrity checking functions that verify successful transmission of control signals and provide error detection capabilities for communication system monitoring and troubleshooting purposes. The control signal transmission functions in the operation 510 support bidirectional data exchange that allows the optimization & control module 128 to receive status information and measurement data from field equipment while transmitting control commands to adjust equipment operating parameters according to the selected configuration specifications.

With continued reference to FIG. 5, the process proceeds to an operation 512 that comprises physically adjusting the facility's reactive power compensation through implementation of the transmitted control signals by the inverter and switchgear equipment. The operation 512 involves the execution of power factor adjustment commands by individual inverter control systems within the inverter fleet 102, where each inverter modifies its reactive power output characteristics according to the power factor settings specified in the control signals received from the optimization & control module 128. In some cases, the operation 512 includes the operation of motor-operated switches or contactors that connect or disconnect capacitive elements within the capacitor bank array 110 according to the switchgear control signals generated in previous process steps. The operation 512 incorporates status monitoring functions that verify successful implementation of control commands and provide feedback regarding equipment operating conditions to the optimization & control module 128 for confirmation that the selected configuration has been properly implemented. The physical adjustment functions performed in the operation 512 result in measurable changes to reactive power flows throughout the plant-level electrical network 116, where the changes affect power factor characteristics measured at the point of interconnection (POI) 126 according to the reactive power compensation strategy defined in the selected configuration.

The control signal implementation process continues with an operation 514 that comprises maintaining the power factor requirement under operating conditions through continuous monitoring and adjustment of reactive power compensation equipment. The operation 514 implements steady-state control functions that monitor power factor measurements at the point of interconnection (POI) 126 and equipment operating parameters throughout the facility to ensure continued compliance with interconnection requirements under normal operating conditions. In some cases, the operation 514 incorporates adaptive control algorithms that respond to gradual changes in generation output, equipment performance characteristics, or electrical system conditions that affect reactive power balance within the facility over time. The operation 514 maintains historical records of power factor measurements, control actions, and equipment status information to support performance analysis and regulatory reporting requirements for the electrical generation facility 100. The power factor maintenance functions in the operation 514 provide feedback data that is used to refine control signal generation algorithms and improve the accuracy of reactive power compensation strategies implemented through coordinated operation of the inverter fleet 102 and the capacitor bank array 110.

The control signal generation and implementation process concludes with an operation 516 that comprises providing long-term operational management capabilities that maintain the effectiveness of reactive power compensation strategies under varying facility operating conditions. The operation 516 implements scheduling functions that coordinate control signal generation with anticipated changes in generation output, seasonal variations in electrical system losses, and planned maintenance activities that affect equipment availability within the Inverter Fleet 102 or the Capacitor Bank Array 110. In some cases, the operation 516 incorporates learning algorithms that analyze historical operating data to identify patterns in reactive power compensation requirements and optimize control signal generation strategies based on operational experience accumulated over extended facility operating periods. The operation 516 provides interface functions that support facility lifecycle management by maintaining configuration databases, equipment performance records, and control system documentation that inform decisions regarding equipment upgrades, capacity expansions, or operational modifications that could affect power factor characteristics and interconnection compliance. The long-term operational management functions in the operation 516 ensure that the facility's reactive power compensation capabilities remain effective throughout the facility operating lifetime while adapting to changes in equipment performance, interconnection requirements, or operational objectives that evolve over time.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions that, when executed by one or more processors, cause the one or more processors to configure an electrical generation facility to meet a power factor requirement at a point of interconnection by:

- determining a range of inverter counts from a minimum quantity to a maximum design capacity for the electrical generation facility;
- generating a plurality of combinations of inverter counts and inverter power factor settings, wherein the inverter power factor settings range from a highest permissible power factor to a minimum permissible power factor based on manufacturer specifications;
- filtering, from the plurality of combinations, combinations where a product of the inverter count and an active power output at the corresponding inverter power factor setting exceeds a peak output limit at the point of interconnection of the electrical generation facility to generate a modified plurality of combinations;
- for each combination of inverter count and power factor setting of the modified plurality of combinations:
  - calculating a total reactive power contribution from the inverters;
  - determining a plant-level power factor based on the total reactive power contribution from the inverters by determining real and reactive losses across components of the electrical generation facility; and
  - determining a capacitor bank size to address a remaining gap in reactive power needed to meet the power factor requirement at the point of interconnection;
- generating a configuration matrix comprising a plurality of configurations for the electrical generation facility, wherein each configuration includes a combination of inverter count and power factor setting from the modified plurality of combinations and a corresponding capacitor bank size;
- applying an optimization algorithm to the configuration matrix to determine deployment factors for each configuration of the plurality of configurations; and
- selecting a configuration from the configuration matrix based on the deployment factors for each configuration of the plurality of configurations.

2. The non-transitory computer-readable medium of claim 1, wherein the instructions cause the one or more processors to optimize each column in the configuration matrix to mitigate costs.

3. The non-transitory computer-readable medium of claim 2, wherein optimizing each column in the configuration matrix comprises, for each inverter count, selecting an inverter power factor setting that minimizes the capacitor bank size needed to meet the power factor requirement at the point of interconnection.

4. The non-transitory computer-readable medium of claim 1, wherein determining the real and reactive losses across the components of the electrical generation facility comprises modeling losses from:

- conductor wire losses;
- inverter inefficiencies;
- medium-voltage transformer losses; and
- high-voltage transformer losses.

5. The non-transitory computer-readable medium of claim 1, wherein the deployment factors include initialization cost, expected energy production, and financial return.

6. The non-transitory computer-readable medium of claim 5, wherein the financial return includes at least one of net present value, internal rate of return, or payback period.

7. The non-transitory computer-readable medium of claim 1, wherein determining the capacitor bank size to address the remaining gap in reactive power needed to meet the power factor requirement at the point of interconnection for each inverter count includes determining a minimum capacitor bank size needed to meet the power factor requirement at the point of interconnection.

8. The non-transitory computer-readable medium of claim 1, wherein the deployment factors include a DC-to-AC ratio for the electrical generation facility.

9. The non-transitory computer-readable medium of claim 8, wherein the electrical generation facility is a solar power plant, and wherein the deployment factors further include solar clipping at the inverters and the point of interconnection based on the DC-to-AC ratio.

10. The non-transitory computer-readable medium of claim 9, wherein the deployment factors include revenue impact from real power delivery affected by the solar clipping.

11. A method for configuring an electrical generation facility to meet a power factor requirement at a point of interconnection, the method comprising:

determining a range of inverter counts from a minimum quantity to a maximum design capacity for the electrical generation facility;

generating a plurality of combinations of inverter counts and inverter power factor settings, wherein the inverter power factor settings range from a highest permissible power factor to a minimum permissible power factor based on manufacturer specifications;

filtering, from the plurality of combinations, combinations where a product of the inverter count and an active power output at the corresponding inverter power factor setting exceeds a peak output limit at the point of interconnection of the electrical generation facility to generate a modified plurality of combinations;

for each combination of inverter count and power factor setting of the modified plurality of combinations:

calculating a total reactive power contribution from the inverters;

determining a plant-level power factor based on the total reactive power contribution from the inverters by determining real and reactive losses across components of the electrical generation facility; and determining a capacitor bank size to address a remaining gap in reactive power needed to meet the power factor requirement at the point of interconnection;

generating a configuration matrix comprising a plurality of configurations for the electrical generation facility, wherein each configuration includes a combination of inverter count and power factor setting from the modified plurality of combinations and a corresponding capacitor bank size;

applying an optimization algorithm to the configuration matrix to determine deployment factors for each configuration of the plurality of configurations; and selecting a configuration from the configuration matrix based on the deployment factors for each configuration of the plurality of configurations.

12. The method of claim 11, further comprising optimizing each column in the configuration matrix to mitigate costs.

13. The method of claim 12, wherein optimizing each column in the configuration matrix comprises, for each inverter count, selecting an inverter power factor setting that minimizes the capacitor bank size needed to meet the power factor requirement at the point of interconnection.

14. The method of claim 11, wherein determining the real and reactive losses across the components of the electrical generation facility comprises modeling losses from:

conductor wire losses;

inverter inefficiencies;

medium-voltage transformer losses; and high-voltage transformer losses.

15. The method of claim 11, wherein the deployment factors include initialization cost, expected energy production, and financial return.

16. The method of claim 15, wherein the financial return includes at least one of net present value, internal rate of return, or payback period.

17. The method of claim 11, wherein determining the capacitor bank size to address the remaining gap in reactive power needed to meet the power factor requirement at the point of interconnection for each inverter count includes determining a minimum capacitor bank size needed to meet the power factor requirement at the point of interconnection.

18. The method of claim 11, wherein the deployment factors include a DC-to-AC ratio for the electrical generation facility.

19. The method of claim 18, wherein the electrical generation facility is a solar power plant, and wherein the deployment factors further include solar clipping at the inverters and the point of interconnection based on the DC-to-AC ratio.

20. The method of claim 19, wherein the deployment factors include revenue impact from real power delivery affected by the solar clipping.

* * * * *